United States Patent
Matsukawa

(10) Patent No.: US 11,560,279 B2
(45) Date of Patent: Jan. 24, 2023

(54) SYSTEMS AND METHODS FOR CLASSIFYING SHEETS OF A PRINTING DEVICE

(71) Applicant: KYOCERA Document Solutions Inc., Osaka (JP)

(72) Inventor: Yuka Matsukawa, Oakland, CA (US)

(73) Assignee: Kyocera Document Solutions Inc., Osaka (JP)

( * ) Notice: Subject to any disclaimer, the term of this patent is extended or adjusted under 35 U.S.C. 154(b) by 836 days.

(21) Appl. No.: 16/460,667

(22) Filed: Jul. 2, 2019

(65) Prior Publication Data

US 2021/0002094 A1 Jan. 7, 2021

(51) Int. Cl.
  *G06K 15/02* (2006.01)
  *G06K 15/16* (2006.01)
  *B65H 7/02* (2006.01)
  *G06N 20/00* (2019.01)

(52) U.S. Cl.
  CPC ............ *B65H 7/02* (2013.01); *G06K 15/021* (2013.01); *G06K 15/16* (2013.01); *G06N 20/00* (2019.01)

(58) Field of Classification Search
  CPC .......................... G06K 15/021; G06K 15/16
  See application file for complete search history.

(56) References Cited

U.S. PATENT DOCUMENTS

| | | | |
|---|---|---|---|
| 6,193,426 B1 | 2/2001 | Guillemin | |
| 2004/0113963 A1* | 6/2004 | Tsujimoto | B41J 11/009 347/14 |
| 2016/0004193 A1* | 1/2016 | Murrell | G03G 15/205 399/83 |
| 2016/0205279 A1* | 7/2016 | Yokoyama | H04N 1/00708 358/1.12 |
| 2017/0269501 A1* | 9/2017 | Kamikura | G03G 15/043 |
| 2020/0230981 A1* | 7/2020 | Gunji | B41J 11/425 |
| 2020/0249892 A1* | 8/2020 | Shikagawa | G06F 3/1208 |
| 2020/0265277 A1* | 8/2020 | Takahashi | G06K 15/16 |
| 2021/0364943 A1* | 11/2021 | Otana | G03G 15/043 |

* cited by examiner

*Primary Examiner* — Nicholas Pachol

(74) *Attorney, Agent, or Firm* — Sheppard, Mullin, Richter & Hampton LLP

(57) ABSTRACT

A method comprises obtaining a training dataset, the training dataset comprising sheet passage interval information associated with conveyance of a plurality of sheets in a sheet conveyance path of a training sheet processing apparatus, at least a portion of the sheets of the plurality of sheets having a known sheet classification of a set of sheet classifications; obtaining sheet timing data associated with the classifying, the sheet timing data comprising sheet passage interval information associated with conveyance of a predetermined number of sheets in the sheet conveyance path of a deployed sheet processing apparatus; classifying, using a machine learning model and the training dataset and the sheet timing data, for each interval window of a plurality of different interval windows, a predetermined number of sheets in a sheet conveyance path of a deployed sheet processing apparatus as a particular classification of the set of sheet classifications; and adjusting, based on the classifying, one or more operational parameters of a deployed sheet processing apparatus.

13 Claims, 27 Drawing Sheets

|  | Time interval (ms) |
|---|---|
| Page 1 | 100 |
| Page 2 | 110 |
| Page 3 | 90 |
| Page N | 600 |

| Page Range | CA2: Below TH2 | CA1: Above TH1 |
|---|---|---|
| P1—P5 | 0 | 0 |
| P6—P9 | 2 | 1 |
| P10—P100 | 8 | 15 |

| Page Number | Feeder - Sensor (ms) |
|---|---|
| 1 | 286 |
| 2 | 304 |
| 3 | 244 |
| 4 | 304 |
| 5 | 310 |

FIG. 19

Machine 1 with Economy paper

| Index (window number) | Page Count | Mean | SD | Median | Max | Min | label |
|---|---|---|---|---|---|---|---|
| 1 | 1-100 | 321 | 5.7 | 322 | 332 | 294 | Economy |
| 2 | 101-200 | 318 | 4.0 | 318 | 328 | 306 | Economy |
| 3 | 201-300 | 318 | 3.9 | 318 | 328 | 310 | Economy |
| 4 | 301-400 | 317 | 3.7 | 317 | 326 | 310 | Economy |
| 5 | 401-500 | 310 | 23.4 | 316 | 326 | 230 | Economy |
| 6 | 501-600 | 311 | 21.9 | 316 | 326 | 220 | Economy |
| 7 | 601-700 | 318 | 3.8 | 318 | 330 | 312 | Economy |
| 707 | 70701 - 70800 | 316 | 12.4 | 318 | 328 | 224 | Economy |
| 708 | 70801 - 70900 | 302 | 26.2 | 313 | 342 | 234 | Economy |
| 709 | 70901 - 71000 | 317 | 8.2 | 318 | 326 | 244 | Economy |
| 710 | 71001 - 71100 | 319 | 3.8 | 318 | 326 | 310 | Economy |
| 711 | 71101 - 71200 | 319 | 3.8 | 318 | 328 | 312 | Economy |

Machine 1 with Premium paper

| Index (window number) | Page Count | Mean | SD | Median | Max | Min | label |
|---|---|---|---|---|---|---|---|
| 1 | 1-100 | 298 | 25.2 | 308 | 318 | 234 | Premium |
| 2 | 101-200 | 304 | 21.4 | 310 | 320 | 236 | Premium |
| 3 | 201-300 | 308 | 18.9 | 312 | 320 | 234 | Premium |
| 4 | 301-400 | 308 | 18.8 | 312 | 320 | 234 | Premium |
| 5 | 401-500 | 302 | 23.5 | 310 | 322 | 232 | Premium |
| 6 | 501-600 | 302 | 20.0 | 308 | 318 | 236 | Premium |
| 7 | 601-700 | 311 | 8.2 | 312 | 320 | 238 | Premium |
| 705 | 70501 - 70600 | 312 | 3.6 | 312 | 322 | 300 | Premium |
| 706 | 70601 - 70700 | 310 | 3.9 | 310 | 318 | 302 | Premium |
| 707 | 70701 - 70800 | 174 | 94.9 | 114 | 318 | 80 | Premium |
| 708 | 70801 - 70900 | 114 | 12.5 | 115 | 138 | 68 | Premium |
| 709 | 70901 - 71000 | 253 | 90.2 | 312 | 322 | 64 | Premium |
| 710 | 71001 - 71100 | 315 | 11.5 | 316 | 324 | 238 | Premium |
| 711 | 71101 - 71200 | 309 | 19.4 | 314 | 322 | 228 | Premium |

FIG. 20

| Index (window number) | Page Count | Predicted | Actual (provided by user/technician) |
|---|---|---|---|
| 561 | 56101-56200 | Premium | Economy |
| 562 | 56201-56300 | Premium | Economy |
| 563 | 56301-56400 | Premium | Premium |
| 564 | 56401-56500 | Premium | Premium |

FIG. 21

SYSTEMS AND METHODS FOR CLASSIFYING SHEETS OF A PRINTING DEVICE

BACKGROUND

Copy machines, printers, fax machines, scanners, multi-function devices, and other image forming apparatuses are common devices in business and homes. These image forming apparatuses and other sheet processing apparatuses may perform differently based on the type of paper in the image forming apparatus. Some image forming apparatuses have functionality to ask a user to provide information regarding the type of paper. However, users may forget to enter the information, fail to change the information when paper is changed, and/or otherwise fail to provide the correct information to the image forming apparatus.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various embodiments of the present disclosure include systems, methods, and non-transitory computer readable media configured to obtain a training dataset, the training dataset comprising sheet passage interval information associated with conveyance of a plurality of sheets in a sheet conveyance path of a training sheet processing apparatus, at least a portion of the sheets of the plurality of sheets having a known sheet classification of a set of sheet classifications. Obtaining sheet timing data associated with the classifying, the sheet timing data comprising sheet passage interval information associated with conveyance of a predetermined number of sheets in a sheet conveyance path of a deployed sheet processing apparatus. Classifying, using a machine learning model and the training dataset and the sheet timing data, for each interval window of a plurality of different interval windows, a predetermined number of sheets in a sheet conveyance path of a deployed sheet processing apparatus as a particular classification of the set of sheet classifications. Adjusting, based on the classifying, one or more operational parameters of a deployed sheet processing apparatus.

In some embodiments, the system comprises a portion of the deployed sheet processing apparatus.

In some embodiments, the system comprises at least a portion of a central server system coupled to the deployed sheet processing apparatus over a communication network.

In some embodiments, the one or more operational parameters of the deployed sheet processing apparatus include any of image quality and toner usage.

In some embodiments, the systems, methods, and non-transitory computer readable media are further configured to obtain additional training data associated with the deployed sheet processing apparatus; switch the classifying from using the training dataset to using the additional training data; and classify, using the machine learning model and the additional training data, for each interval window of a second plurality of different second interval windows, a second predetermined number of sheets in the sheet conveyance path of the deployed sheet processing apparatus as a second classification of a second set of sheet classifications.

In some embodiments, the switching is performed based on obtaining a threshold amount of the sheet timing data.

In some embodiments, the second set of sheet classifications includes at least a portion of the set of sheet classifications and at least one additional sheet classification received by the deployed sheet processing apparatus.

In some embodiments, the systems, methods, and non-transitory computer readable media are further configured to receive an actual sheet classification for a particular interval window of the plurality of interval windows; compare the actual sheet classification with the particular classification associated with the particular interval window of the plurality of interval windows; and determine, based on the comparison, an accuracy of the classifying.

In some embodiments, the systems, methods, and non-transitory computer readable media are further configured to iteratively modify any of a type or number of inputs to the machine learning model until a threshold accuracy level is achieved.

In some embodiments, the systems, methods, and non-transitory computer readable media are further configured to obtain additional training data associated with the deployed sheet processing apparatus; switch the classifying from using the training dataset to using the training dataset and the additional training data; and classify, using the machine learning model and the additional training data and the training dataset, for each interval window of a second plurality of different second interval windows, a second predetermined number of sheets in the sheet conveyance path of the deployed sheet processing apparatus as a second classification of a second set of sheet classifications.

In some embodiments, the present invention provides a sheet processing apparatus comprising at least one roller disposed in a sheet conveyance path and configured to convey a plurality of sheets; a sheet sensor disposed in the sheet conveyance path and configured to detect each sheet of the plurality of sheets as the sheet is conveyed by a particular roller of the at least one roller and to generate sensor information indicative of the detection; and a controller. The controller is configured to, for each sheet of a predetermined number of sheets of the plurality of sheets conveyed by the particular roller, use the sensor information to generate an individual sheet-conveyance dataset indicating a sheet passage interval, and store the individual sheet-conveyance dataset in data storage. The controller is further configured to, after the particular roller has conveyed the predetermined number of sheets, calculate a summary sheet-conveyance dataset including sheet passage interval statistics for the predetermined number of sheets, store the summary sheet-conveyance dataset in the data storage, discard the individual sheet-conveyance datasets from the data storage, and evaluate the sheet passage interval statistics to determine whether to modify the predetermined number based on the evaluation.

A data size of the summary sheet-conveyance dataset may be smaller than a data size of the individual sheet-conveyance datasets for the predetermined number of sheets. The controller may be configured to decrease the predetermined number when the sheet passage interval statistics indicate that the number of sheets conveyed abnormally slowly or fast among the predetermined number of sheets is greater than a first threshold value, and increase the predetermined number when the sheet passage interval statistics indicate that the number of sheets conveyed abnormally slowly or fast among the predetermined number of sheets is less than a second threshold value that is smaller than the first threshold value. The controller may decrease the predetermined number by a first predetermined ratio, and increase the predetermined number by a second predetermined ratio. The first predetermined ratio may be equal to the second predetermined ratio. The controller may decrease the predetermined number by a first predetermined number, and increase the predetermined number by a second predetermined number. The controller may be further configured to detect a transmission trigger event, and transmit one or more summary sheet-conveyance datasets stored in the data storage through a network after detecting the transmission trigger event. The transmission trigger event may include at least one of an event when a predetermined scheduled time is reached, an event when a user instruction is received, and an event when a control signal to notify an error is generated. The controller may be further configured to detect a reset trigger event, and perform a clear operation to clear one or more individual sheet-conveyance datasets and one or more summary sheet-conveyance datasets stored in the data storage after detecting the reset trigger event. The reset trigger event may include an event when the particular roller is replaced with a replacement roller.

In some embodiments, the present invention provides a method comprising conveying a plurality of sheets in a sheet conveyance path of a sheet processing apparatus having at least one roller; using a sheet sensor disposed in the sheet conveyance path to detect each sheet of the plurality of sheets as it is conveyed in the sheet conveyance path by a particular roller of the at least one roller and to generate sensor information indicative of the detection; and for each sheet of a predetermined number of sheets of the plurality of sheets conveyed by the particular roller: using the sensor information to generate an individual sheet-conveyance dataset indicating a sheet passage interval; and storing the individual sheet-conveyance dataset in data storage; after the particular roller has conveyed the predetermined number of sheets: calculating a summary sheet-conveyance dataset including sheet passage interval statistics for the predetermined number of sheets; storing the summary sheet-conveyance dataset in the data storage; discarding the individual sheet-conveyance datasets from the data storage; and evaluating the sheet passage interval statistics to determine whether to modify the predetermined number based on the evaluation.

The data size of the summary sheet-conveyance dataset may be smaller than a data size of the individual sheet-conveyance datasets for the predetermined number of sheets. Modification of the predetermined number based on the evaluation may comprise: decreasing the predetermined number when the sheet passage interval statistics indicate that the number of sheets conveyed abnormally slowly or fast among the predetermined number of sheets is greater than a first threshold value; and increasing the predetermined number when the sheet passage interval statistics indicate that the number of sheets conveyed abnormally slowly or fast among the predetermined number of sheets is less than a second threshold value that is smaller than the first threshold value. The predetermined number may be decreased by a first predetermined ratio, and increased by a second predetermined ratio. The first predetermined ratio may be equal to the second predetermined ratio. The predetermined number may be decreased by a first predetermined number, and increased by a second predetermined number. The method may further comprise detecting a transmission trigger event; and after detecting the transmission trigger event, transmitting one or more summary sheet-conveyance datasets stored in the data storage through a network. The transmission trigger event may include at least one of an event when a predetermined scheduled time is reached, an event when a user instruction is received, and an event when a control signal to notify an error is generated. The method may further comprise detecting a reset trigger event; and after detecting the reset trigger event, performing a clear operation to clear one or more individual sheet-conveyance datasets and one or more summary sheet-conveyance datasets stored in the data storage. The reset trigger event may include an event when the particular roller is replaced with a replacement roller.

These and other advantages will become apparent to those skilled in the relevant art upon a reading of the following descriptions and a study of the several examples of the drawings.

BRIEF DESCRIPTION OF THE DRAWINGS

FIG. 19 illustrates a table of example sheet conveyance intervals for individual sheets according to some embodiments.

FIG. 20 illustrates a table of example summary statistics for individual sheets according to some embodiments.

FIG. 21 illustrates a table that shows predicted and actual sheets types including incorrect classifications according to some embodiments.

DETAILED DESCRIPTION

Figure 1A:
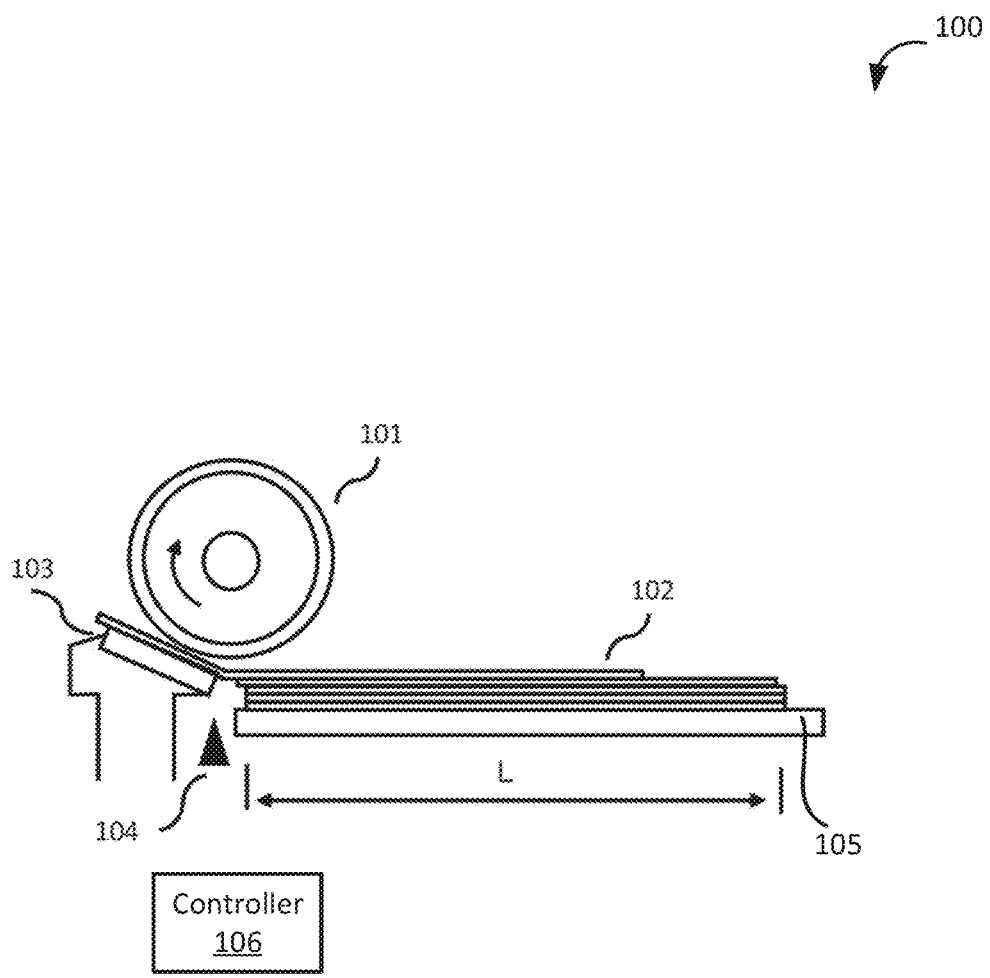
FIG. 1A illustrates a schematic example of a side view of a sheet processing apparatus according to some embodiments.

Some embodiments of the present disclosure are directed at systems and methods for calculating sheet-conveyance datasets to be used for detecting sheet conveyance anomalies in a sheet processing apparatus. In some cases, a sheet is conveyed more slowly than designed, which may cause sheet collision with a subsequently conveyed sheet. In other cases, a sheet is conveyed more quickly than designed, which may cause sheet collision with a previously conveyed sheet. A sheet collision may cause a malfunctioning of the sheet processing apparatus such as sheet jams and printing problems, and may demand significant effort to resolve. Accordingly, in some embodiments, a sheet processing apparatus calculates sheet-conveyance datasets, and summarizes the sheet-conveyance datasets to save storage space and store more datasets. The sheet processing apparatus further transmits the sheet-conveyance datasets to an external system, such as a server, such that the external system can determine abnormal sheet conveyances based on the sheet-conveyance datasets and evaluate the sheet conveyance anomalies to determine when to notify a user.

In some embodiments, a sheet processing apparatus includes at least one roller, a sheet sensor, and a controller. The roller is disposed in a sheet conveyance path and configured to convey a plurality of sheets. The sheet sensor is disposed in the sheet conveyance path, possibly adjacent to the roller, and is configured to detect each sheet of the plurality of sheets as the sheet is conveyed by a particular roller of the at least one roller. The sheet sensor is also configured to generate sensor information indicative of the detection. In some embodiments, the controller is configured to, for each sheet of a predetermined number of sheets of the plurality of sheets conveyed by the particular roller, use the sensor information to generate an individual sheet-conveyance dataset indicating a sheet passage interval, and store the individual sheet-conveyance dataset in data storage. The data storage may be an internal storage of the sheet processing apparatus and/or an external storage detachably attached to the sheet processing apparatus. The controller is further configured to, after the particular roller has conveyed the predetermined number of sheets, calculate a summary sheet-conveyance dataset including sheet passage interval statistics for the predetermined number of sheets, store the summary sheet-conveyance dataset in the data storage, and discard the individual sheet-conveyance datasets from the data storage. The controller may be further configured to evaluate the sheet passage interval statistics to determine whether to modify the predetermined number based on the evaluation.

According to a sheet processing apparatus of some embodiments, a certain number of individual sheet-conveyance datasets are generated, a summary sheet-conveyance dataset is calculated therefrom, and the individual sheet-conveyance datasets are discarded to secure more space of the data storage. As a result, even if a large number of sheets are processed in a short period of time, sheet-conveyance datasets can be stored without losing data, and sheet conveyance anomalies can be more reliably detected based on the sheet-conveyance datasets.

Some embodiments of the present disclosure are directed to a system for classifying sheets (e.g., sheets of paper) in a sheet processing apparatus. Example sheet processing apparatuses include printers, multi-function printers, facsimile machines, copiers, and scanners. The system may collect the paper travel time data (e.g., sheet-conveyance datasets, summary statistics) from a deployed sheet processing apparatus, aggregate such data, and a predict a sheet type (e.g., economy or premium) using a machine learning technique and/or model (e.g., a supervised machine learning model). Based on the predicted classification, the system may adjust one or more operational parameters of the sheet processing apparatus. For example, the system may adjust image quality, enhance toner usage, prolong life of components (e.g., printer cartridges, sensors, rollers, and/or the like).

Figure 1B:
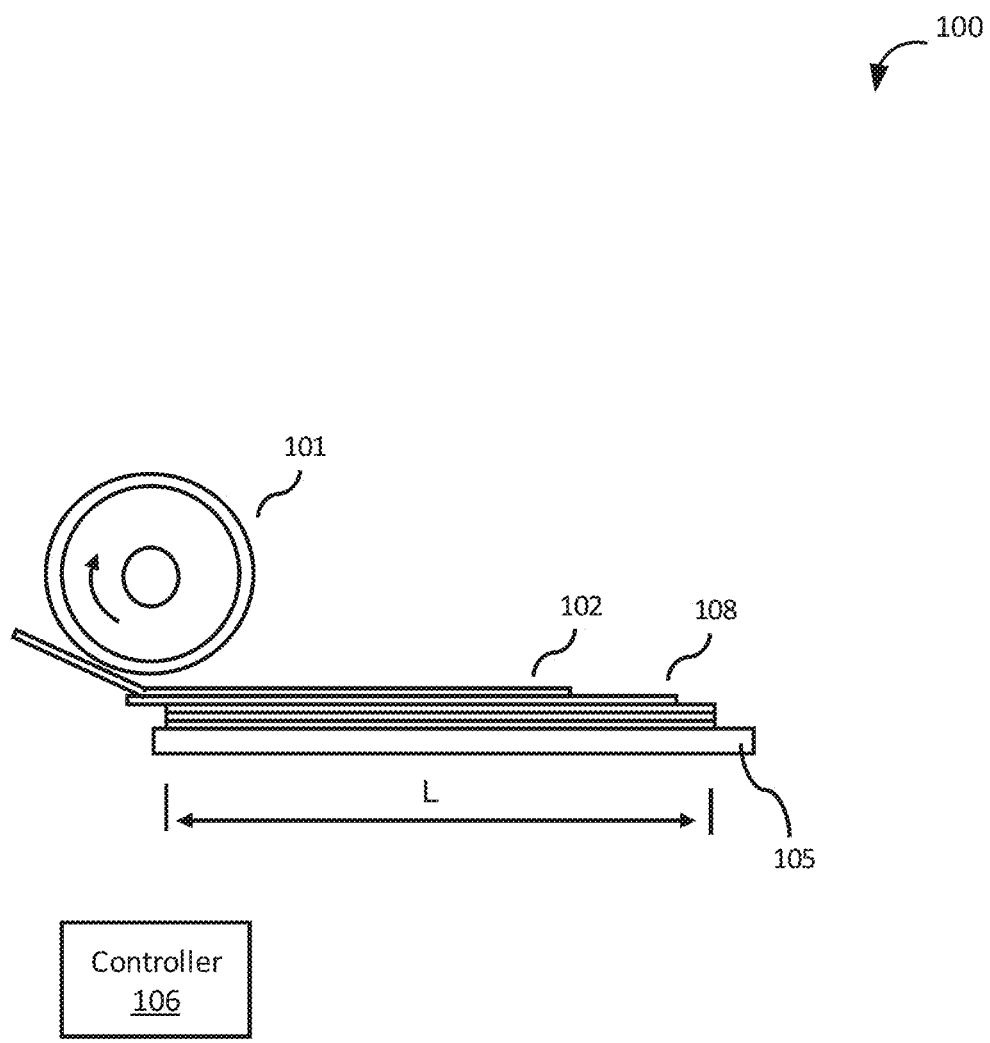
FIG. 1B illustrates a schematic example of a side view of the sheet processing apparatus when multiple sheets are drawn by a sheet feeding roller according to some embodiments.
Figure 1C:
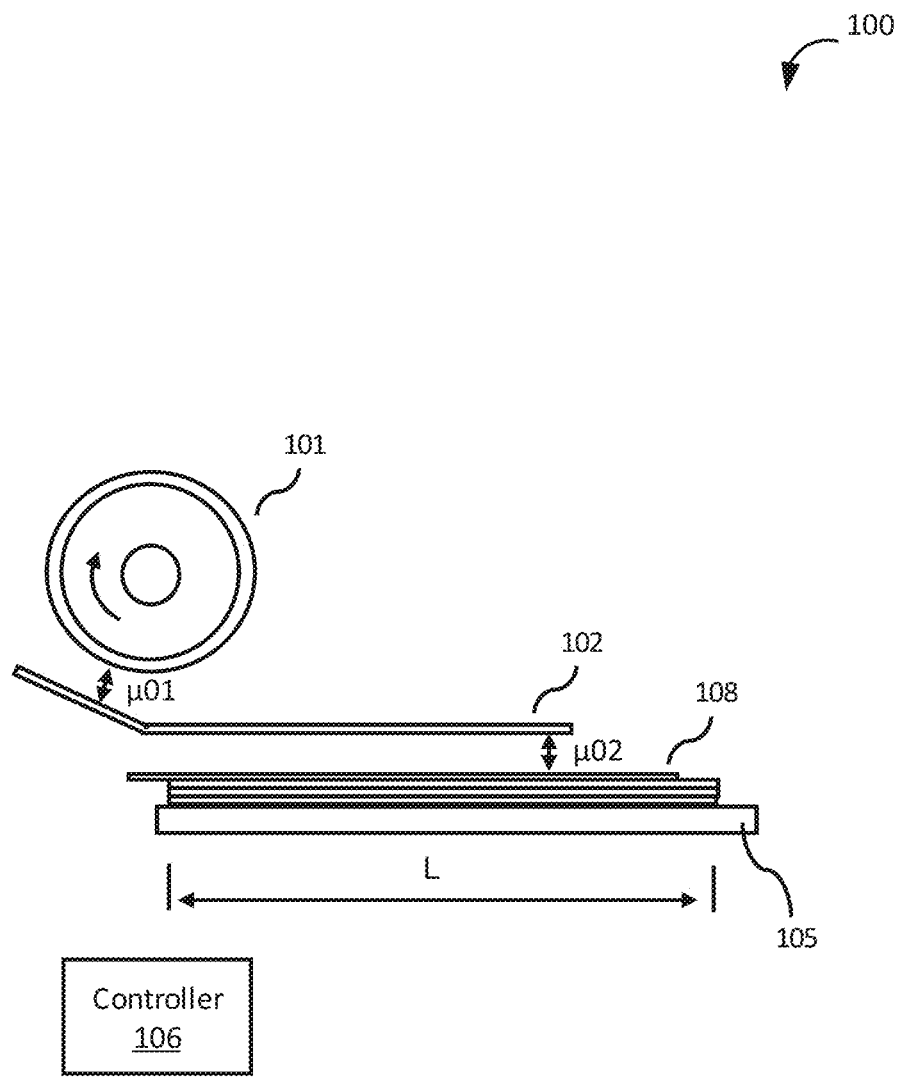
FIG. 1C illustrates a schematic example of a side view of the sheet processing apparatus to explain friction of a sheet with adjacent components according to some embodiments.

FIG. 1A illustrates a schematic example of a side view of a sheet processing apparatus 100 according to some embodiments. FIG. 1B illustrates a schematic example of a side view of the sheet processing apparatus 100 when multiple sheets are drawn by a sheet feeding roller according to some embodiments. FIG. 1C illustrates a schematic example of a side view of the sheet processing apparatus 100 to explain friction of a sheet with adjacent components according to some embodiments. In FIG. 1B and FIG. 1C, several components of the sheet processing apparatus 100 are not depicted to simplify the illustration. In the example, the sheet processing apparatus 100 includes a sheet feeding roller 101, a lifting panel 103, a sensor 104, a sheet holder 105 on which a plurality of sheets 102 is placed, and a controller 106. In some embodiments, the sheet processing apparatus 100 is a sheet feeding device independent of or integrated in an image forming apparatus, such as a printer, a copier, a scanner, a facsimile, a multi-function peripheral (MFP), and so on, and is configured to supply sheets to the sheet processing apparatus 100. In some embodiments, the sheet processing apparatus 100 is a finisher independent of or integrated in the image forming apparatus, configured to receive sheets from the image forming apparatus, and configured to perform sheet processing such as stapling, binding, folding, punching, and so on.

The sheet feeding roller 101 is intended to represent a roller configured to rotate about a rotational axis for conveying sheets 102 placed on the sheet holder 105, one by one. Depending upon a specific implementation and other considerations, a surface of the sheet feeding roller 101 is formed of a material that causes frictional gripping force with a surface of a conveyed sheet. For example, a surface of the sheet feeding roller 101 is formed of rubber, resin, metal, and so on. For example, a surface of the sheet feeding roller 101 has a rugged shape, a smooth shape, a gear shape, and so on. The sheets discussed in the present disclosure include paper (e.g., copier paper), transparent films, cardboard (e.g., post card, business card, etc.), and so on. In some embodiments, the sheet feeding roller 101 is disposed above an end of the sheet holder 105 from which the sheets 102 are conveyed. In some embodiments, the sheet feeding roller 101 is caused to rotate in a sheet conveying direction by a motor or any other applicable actuator, in order to convey the sheets 102. The sheet feeding roller 101 may be configured to rotate at a predetermined rotational speed. In some embodiments, the predetermined rotational speed may differ based on print/scan quality settings or other settings. Rotational speed can be monitored separately from the sheet conveyance interval.

The lifting panel 103 is intended to represent a member configured to guide sheets 102 conveyed by the sheet feeding roller 101 in the sheet conveying direction. The lifting panel 103 is inclined towards an upper direction with respect to a surface of the sheet holder 105 on which the sheets 102 are placed. Depending upon a specific implementation and other consideration, a surface of the lifting panel 103 is formed of applicable materials, such as plastic, resin, metal, a combination thereof, and so on.

The sensor 104 is intended to represent a sensor configured to detect passage of a sheet at the position of the sensor. Depending upon a specific implementation and other considerations, the sensor 104 may employ any applicable technique to detect a sheet passage. For example, the sensor 104 may include an optical sensor configured to detect the start of a sheet and the end of a sheet based on lighting changes caused by the passage of the sheet. In another example, the sensor 104 includes a mechanical sensor configured to detect the start of a sheet and the end of a sheet based on a mechanical movement of parts caused by the passage of the sheet. In some embodiments, the sensor 104 may be configured to generate a detection signal when a front end of a sheet passes the sensor 104 and a tail end of the sheet passes the sensor 104. In some embodiments, the sensor 104 is disposed at a position adjacent to the sheet feeding roller 101, e.g., immediately before or immediately after the sheet feeding roller 101. In some embodiments, the sensor 104 is disposed above or below the sheet feeding roller 101.

The sheet holder 105 is configured to support the sheets 102 and allow the sheets 102 to be conveyed by the sheet feeding roller 101. Depending on implementation, the sheet holder 105 may be formed of any applicable materials, such as plastic, resin, metal, and combination thereof. In some embodiments, mechanical levers on the sheet holder 105 may be adjustably fixed to support and identify the size in the sheets. The controller 106 may be capable of detecting the size of the sheets in the sheet holder 105 based on the positions of the levers. In some embodiments, sheet size can be determined based on electronic settings. In some embodiments, the sheet holder 105 is configured to move up and down depending on weights of the sheets 102 placed thereon, such that a top sheet is at a position that can be positioned to contact the sheet feeding roller 101 for conveyance.

The controller 106 is a hardware computing device configured to control operations of the sheet processing apparatus 100. In some embodiments, the controller 106 controls rotation of the sheet feeding roller 101 and processes signals generated by and received from the sensor 104. In some embodiments, the controller 106 may control the sheet feeding roller 101 to rotate at a predetermined rotational rate. In some embodiments, the controller 106 is configured to calculate sheet passage intervals based on the detection signals generated by and received from the sensor 104. For example, the controller 106 calculates a sheet passage interval based on a time of a detection signal corresponding to detection of a front end of a sheet and a time of a detection signal corresponding to detection of a tail end of the sheet. In some embodiments, the controller 106 is configured to compare each sheet passage interval against one or more thresholds, to determine whether the sheet has been conveyed by the sheet feeding roller 101 within a trusted time interval. For example, the controller 106 compares a sheet passage interval with a first threshold to determine whether conveyance of the sheet is excessively slow, which may suggest an error in the conveyance of the sheet. In another example, the controller 106 compares a sheet passage interval with a second threshold (lower than the first threshold) to determine whether conveyance of the sheet is excessively fast, which may also suggest a different error in the conveyance of the sheet.

In some embodiments, the controller 106 may be configured to determine deviations of sheet passage intervals of sheets across multiple sensors in the sheet conveyance path of the sheet processing apparatus 100. The controller 106 may detect sheet passage anomalies based on deviations. In some embodiments, sheet conveyance intervals may be expected to be relatively consistent across the sheet conveyance path.

Based on a number or egregiousness of anomalies, e.g., when a sheet passage interval is greater than the first threshold (excessively slow), a friction force between the sheet feeding roller 101 and a top sheet may be insufficient. In a case, when a kinematic friction coefficient µ01 (shown in FIG. 1C) of the friction between the sheet feeding roller 101 and the top sheet is excessively low, the friction force may be insufficient. In a case, anomalies of the kinematic friction coefficient µ01 may be caused by defects of the sheet feeding roller 101, improper quality of sheet (e.g., slippery sheet) may lead to longer sheet passage interval. Similarly, when a sheet passage interval is smaller than the second threshold (excessively fast), the sheet feeding roller 101 may be malfunctioning, a sheet 108 underneath a top sheet may be conveyed together with the top sheet (shown in FIG. 1B), and so on. In a case, when a kinematic friction coefficient µ02 (shown in FIG. 1C) of the friction between the top sheet and the sheet 108 underneath the top sheet is excessively high, the friction force may be excessively high. In a case, anomalies of the kinematic friction coefficient µ02 may be caused by improper quality and/or conditions of sheets (e.g., wet sheets, jammed sheets, etc.) may lead to the companied sheet conveyance.

In some embodiments, notifications may be generated when there is a specific count of anomalies, when an anomaly is significantly outside of the expected range. Anomaly count may be based on the significance of the anomalies, e.g., anomalies may be weighted based on how far outside the trusted range they are, e.g., how many standards of deviation they are outside the trusted range.

In some embodiments, the controller 106 may be configured to differentiate or adjust the first threshold and/or the second threshold based on various applicable criteria. For example, the controller 106 differentiates the first threshold and/or the second threshold based on at least one of sheet type, sheet size (length) in a sheet conveying direction, rotational rate of the sheet feeding roller 101, etc. In some embodiments, the controller 106 may increase the first threshold and/or the second threshold as a surface roughness of sheet (e.g., arithmetical mean deviation) becomes smaller. In some embodiments, the controller 106 may increase the first threshold and/or the second threshold when a length of sheet in the sheet conveying direction is longer. In some embodiments, the controller 106 may increase the first threshold and/or the second threshold as the rotational rate of the sheet feeding roller 101 is slowed. In some embodiments, as image forming quality (e.g., DPI value) becomes higher, the rotational rate of the sheet feeding roller 101 may become slower.

In some embodiments, the controller 106 may differentiate the first threshold and/or the second threshold based on a number of sheet passages within a certain duration of time. The controller 106 may modify the first threshold and/or the second threshold for a first group of sheets (e.g., first several number of sheets) relative to a second group of sheets (e.g., second several number of sheets) passed after the first group of sheets, and/or may modify the first threshold and/or the second threshold for the second group of sheets than the first group of sheets. This differentiation may be based on expectation of greater interval fluctuation as the cumulative number increases.

In another example, the controller 106 differentiates the first threshold and/or the second threshold based on at least one of a geographical region at which the sheet processing apparatus 100 is located, a model of an image processing device (e.g., printing device, scanning device, etc.) incorporating or coupled to the sheet processing apparatus 100, use purpose (e.g., business, home, etc.) of the sheet processing apparatus 100, and recommended values for the sheet processing apparatus 100 determined based on the various applicable criteria. In some embodiments, the controller 106 may increase the first threshold and/or the second threshold based on an average humidity of the geographical region (e.g., city, county, etc.) at which the sheet processing apparatus 100 is located. In some embodiments, the controller 106 may increase the first threshold and/or the second threshold based on environmental conditions (e.g., humidity, temperature, UV amount, etc.) of a more specific location at which the sheet processing apparatus 100 is located, such as a building, a floor in a building, a room in a building, and an air conditioning zone in a building.

In some embodiments, the controller 106 may be configured to count the number of times the sheet passage interval is greater than the first threshold (hereinafter "first threshold count") and store the first threshold count in data storage included in or coupled to the controller 106. Similarly, in some embodiments, in processing the detection signals generated by the sensor 104, the controller 106 is configured to count the number of times the sheet passage interval is smaller than the second threshold (hereinafter "second threshold count") and store the second threshold count in data storage included in or coupled to the controller 106. The first threshold count and/or the second threshold count may suggest a degree of a sheet conveyance anomaly. For example, when the first threshold count is 5, the sheet conveyance anomaly is likely more serious than when the first threshold count is 2. The data storage may have a limited capacity. Since storing the calculated sheet passage intervals for each sheet passage may require a large data capacity, the calculated sheet passage interval may not be stored in the data storage.

In some embodiments, the controller 106 may be configured to count the first threshold count and/or the second threshold count within a parameter. The parameter may be an applicable duration of time. In some implementations, the certain duration of time is a past predetermined period of time sliding according to time passage (e.g., sliding window). For example, the past predetermined period of time may be the past several hours, the past day (24 hours), the past week, the past month, the past 30 days, and so on. In some embodiments, the parameter may be based on usage of the sheet processing apparatus. For example, the parameter may be based on the last predetermined number of sheets (e.g., 300 sheets, 500 sheets, etc.) conveyed by the sheet feeding roller 101. In such a case, the controller 106 may be looking for a certain rate of anomalous passage times over a rolling sheet count or a certain number of anomalous passage intervals over a period of time.

In some embodiments, the controller 106 may be configured to determine whether or not the first threshold count and/or the second threshold count meets an alert condition. In some embodiments, an alert condition includes one or more of a condition that the first number of times exceeds a first alert threshold, a condition that the second threshold count exceeds a second alert threshold, and a condition that a sum of the first and second threshold counts exceeds a third alert threshold.

In some embodiments, the controller 106 may be configured to differentiate or adjust the first alert threshold, the second alert threshold, and/or the third alert threshold based on various applicable criteria. For example, the controller 106 may differentiate the first alert threshold, the second alert threshold, and/or the third alert threshold based on an image forming quality (e.g., DPI value) and/or user setting. In a specific implementation, the controller 106 sets one or more of the first, second, and third alert thresholds to be lower as the image forming quality becomes higher.

In another example, the controller 106 differentiates the first alert threshold and/or the second alert threshold based on at least one of the geographical region, the model of the image processing device, the use purpose, and recommended values, in a similar manner as the criteria that can be employed for the first threshold and/or the second threshold described above.

In some embodiments, the controller 106 may be configured to compare the first threshold count and/or the second threshold count obtained at different periods, and determine whether or not an alert condition has been met based on the comparison. For example, the controller 106 compares the first threshold count and/or the second threshold count obtained one day before (past 24 hours) with the first threshold count and/or the second threshold count obtained two days before (past 24-48 hours). In such a case, the alert condition may be that an increase amount of the first threshold count and/or the second threshold count exceeds a predetermined threshold, or that an increase rate of the first threshold count and/or the second threshold count exceeds a predetermined threshold. In another example, the controller 106 compares the first threshold counts and/or the second threshold counts obtained in the past 24 hours at two different time points (e.g., noon and midnight).

In some embodiments, the controller 106 may be configured to generate a control signal upon an alert condition being met, and output a notification upon an alert condition being met. In some embodiments, the control signal causes output of a notification, which may include the first threshold count and/or the second threshold count to be presented to users. For example, when the controller 106 causes the first threshold count and/or the second threshold count to be displayed on a display device included in or coupled to the sheet processing apparatus 100, the controller 106 outputs the first threshold count and/or the second threshold count to the display device. In some embodiments, the notification includes a message to a user, which may notify a current state of sheet conveyance, a proposal to perform maintenance, an alert message that image processing may not be properly performed, and so on.

In some embodiments, the control signal causes change of an operational mode of the sheet processing apparatus 100 upon the alert condition being met. In some embodiments, the operational modes include a normal sheet conveyance mode in which a sheet conveyance is performed normally and an error sheet conveyance mode in which a sheet conveyance may be performed at a reduced sheet conveyance speed with respect to the normal mode or may not be performed.

In some embodiments, the control signal may be differentiated depending on the first threshold count and the second threshold count. For example, if the first threshold count is greater than the second threshold count, the controller 106 may generate a first control signal, which may cause generation of a message indicating that the sheet feeding roller 101 needs to be checked. For example, if the second threshold count is greater than the first threshold count, the controller 106 may generate a second control signal, which may cause generation of a message indicating that quality and/or conditions of sheets 102 needs to be checked. For example, if the first threshold count is equal to the second threshold count, the controller 106 may generate a third control signal, which may cause generation of a message indicating that setting for a rotational rate of the sheet feeding roller 101 and/or placement of the sheets 102 needs to be checked.

Figure 2:
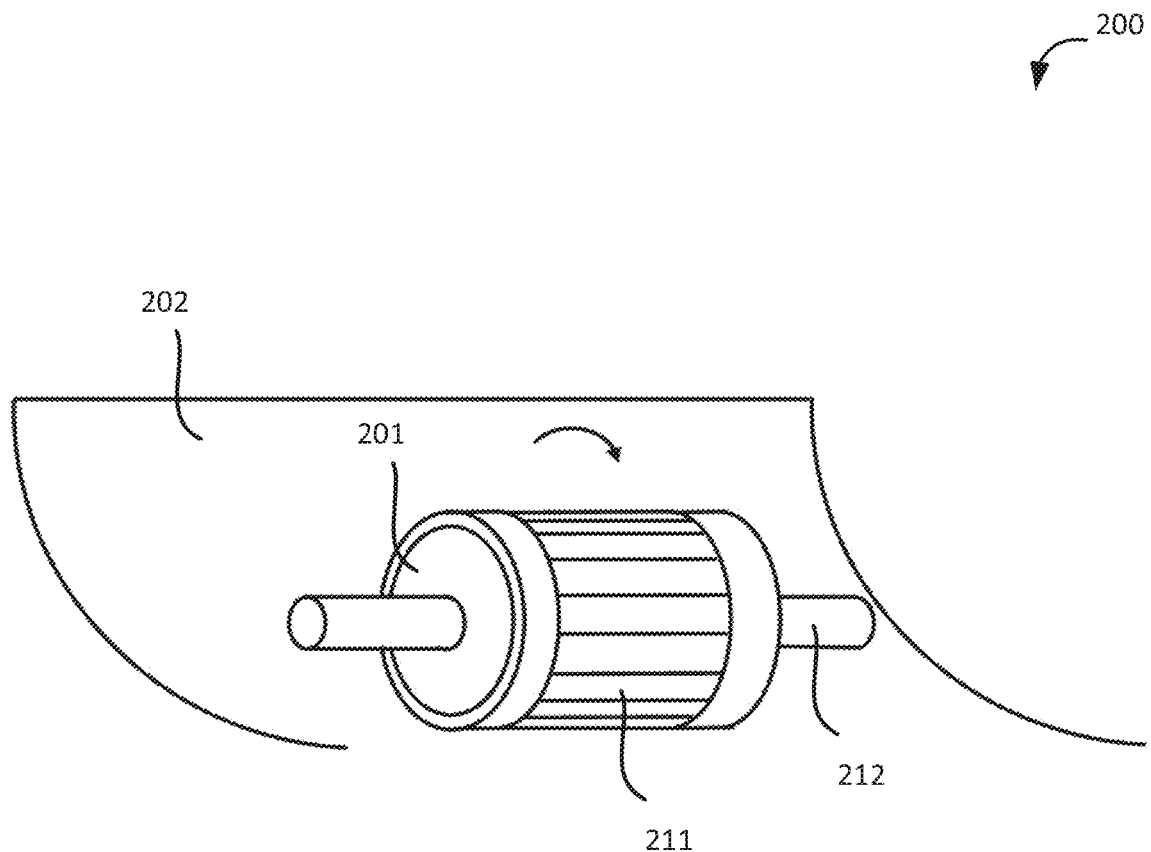
FIG. 2 illustrates a schematic example of a perspective view of a sheet feeding roller according to some embodiments.

FIG. 2 illustrates a schematic example of a perspective view of a sheet feeding apparatus 200 according to some embodiments. In the example of the sheet processing apparatus 200 shown in FIG. 2, a sheet feeding roller 201 includes a sheet contact surface 211 and a rotational axis 212. In some embodiments, the sheet feeding roller 201 corresponds to the sheet feeding roller 101 in FIG. 1A.

The sheet contact surface 211 is intended to represent a surface of the sheet feeding apparatus 200 designed to be in contact with a sheet 202 conveyed by the sheet feeding roller 201. In some embodiments, the sheet contact surface 211 has a rugged surface so as to ensure sufficient friction between the sheet contact surface 211 and a surface of the sheet 202. Depending upon a specific implementation and other considerations, the sheet contact surface 211 is formed of applicable materials, such as rubber, resin, metal, combination thereof, and so on.

The rotational axis 212 is intended to represent a member coupled to a main body of the sheet feeding roller 201 including the sheet contact surface 211. In some embodiments, the rotational axis 212 is caused to rotate in a sheet conveying direction by a motor or any applicable actuator (not shown in FIG. 2) provided at an end of the rotational axis 212.

Depending upon a specific implementation and other considerations, when the sheet 202 is not pressed against the sheet contact surface 211 with sufficient force, the sheet 202 may not be properly conveyed or may be conveyed at a speed slower than intended.

Figure 3:
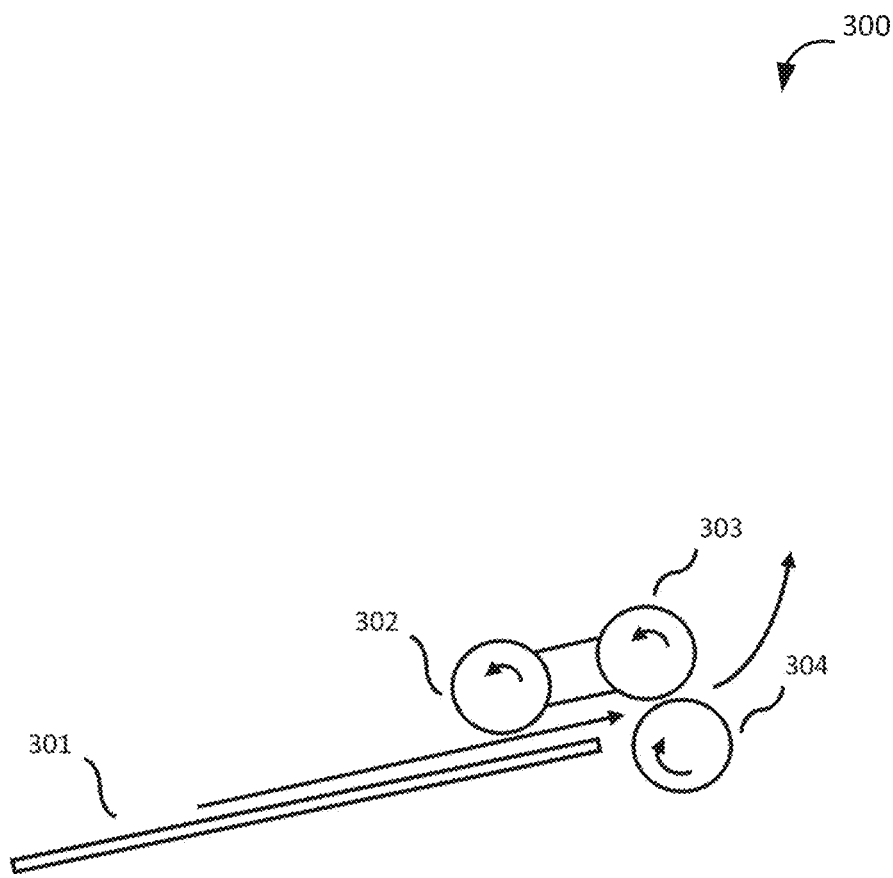
FIG. 3 illustrates a schematic example of a side view of a sheet feeding roller unit according to some embodiments.

FIG. 3 illustrates a schematic example of a side view of a sheet feeding apparatus with a sheet feeding roller unit 300 according to some embodiments.

In the example of the sheet processing apparatus shown in FIG. 3, a sheet feeding roller unit 300 includes a sheet pickup roller 302, a sheet feeding roller 303, and a sheet separation roller 304. In some embodiments, the sheet pickup roller 302 and/or the sheet feeding roller 303 corresponds to the sheet feeding roller 101 in FIG. 1A.

The sheet pickup roller 302 is intended to represent a roller configured to pick up a sheet 301 that comes in contact with the sheet pickup roller 302. In some embodiments, the sheet pickup roller 302 is positioned above a sheet holder (not shown) so as to be in contact with a top sheet on the sheet holder.

The sheet feeding roller 303 is intended to represent a roller configured to convey a sheet 301 picked up by the sheet pickup roller 302. In some embodiments, a rotational direction of the sheet feeding roller 303 is the same as that of the sheet pickup roller 302. In some embodiments, the sheet pickup roller 302 and the sheet feeding roller 303 are mechanically coupled such that rotations of the sheet pickup roller 302 and the sheet feeding roller 303 coincide. In a specific implementation, conveyance speeds (e.g., radius× rotational rate) of the sheet pickup roller 302 and the sheet feeding roller 303 are the same.

The sheet separation roller 304 is intended to represent a roller configured to separate the top sheet, such that only the top sheet is conveyed by the sheet feeding roller 303. In some embodiments, a rotational rate and/or a conveyance speed of the sheet separation roller 304 may be different (e.g., slower) from a rotational rate and/or a conveyance speed of the sheet feeding roller 303. Also, depending upon a specific implementation and other considerations, a rotational direction of the sheet separation roller 304 may be opposite to the rotational direction of the sheet feeding roller 303.

In some embodiments, a sensor to detect sheet passage (not shown in FIG. 3) may be disposed at any applicable positions of the sheet feeding roller unit 300. In some embodiments, the sensor may be disposed between the sheet pickup roller 302 and the sheet feeding roller 303. The sensor may be disposed at a position after the sheet feeding roller 303 in the sheet conveyance direction. The sensor may be configured to detect a sheet conveyance anomaly caused by the sheet pickup roller 302, the sheet feeding roller 303 and/or the sheet separation roller 304.

Figure 4:
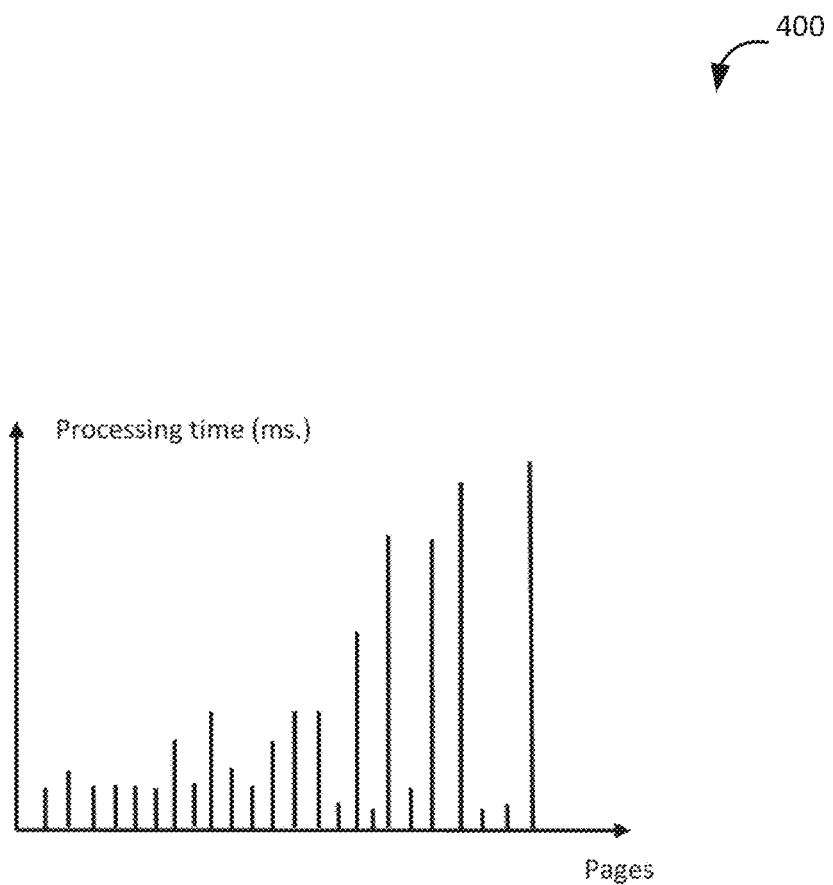
FIG. 4 illustrates a graph of example sheet passages and sheet conveyance intervals according to some embodiments.

FIG. 4 illustrates a graph 400 of sheet passage relative to sheet conveyance interval according to some embodiments. The vertical axis shown in FIG. 4 indicates a sheet conveyance interval (millisecond), and the horizontal axis indicates a sheet passage that has been performed during a certain duration of time. The graph shown in FIG. 4 is generated from sheet passage signals generated by one sensor disposed in a sheet conveyance path, e.g., a position adjacent to a sheet feeding roller.

As shown in FIG. 4, the fluctuation of the sheet conveyance interval is small for the earlier several pages, but is significant for the later pages. This result may be caused by defect and/or degradation of one or more rollers.

Figure 5:
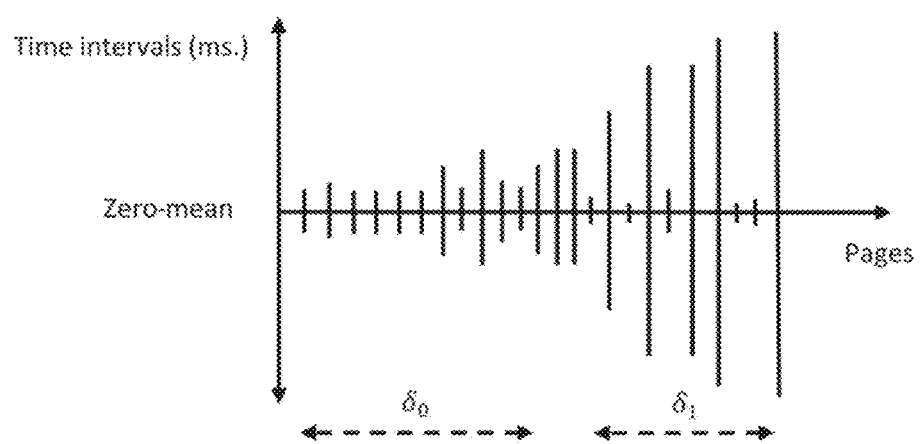
FIG. 5 illustrates a graph of example sheet passages and sheet conveyance intervals relative to an average sheet conveyance interval according to some embodiments.

FIG. 5 illustrates a graph 500 of a sheet conveyance interval shifted relative to an average sheet conveyance interval according to some embodiments. The vertical axis indicates a sheet conveyance interval (millisecond) relative to a zero-mean, and the horizontal axis indicates a sheet passage that has been performed during a certain parameter (duration of time or usage).

As shown in FIG. 5, a fluctuation of the sheet conveyance interval is small for the earlier several pages, but becomes larger for the later pages. As a result, a standard deviation of the sheet conveyance interval for a first group of pages (i.e., δ0) is smaller than that for a second group of pages after the first group of pages (i.e., δ1). In some embodiments, the standard deviation can be used to determine the first threshold and/or the second threshold. In some embodiments, the standard deviation may be recalculated dynamically for further sheet interval evaluation. In some embodiments, as a standard deviation increases, the first threshold may be increased. As a standard deviation decreases, the second threshold may be decreased. In some embodiments, the thresholds may be static, set by the manufacturer, and/or modified by the user.

Figure 6:
FIG. 6 illustrates a table of example sheet conveyance intervals for individual sheets according to some embodiments.

FIG. 6 illustrates a chart 600 of example sheet conveyance intervals for N pages according to some embodiments. As shown in FIG. 6, a sheet conveyance interval may become excessively large or small as the number of sheet passages increases. As shown, the sheet conveyance intervals for pages 1, 2, and 3 are within a normal range (e.g., 50-150 ms), and the sheet conveyance interval for page N is outside of the normal range.

Figure 7:
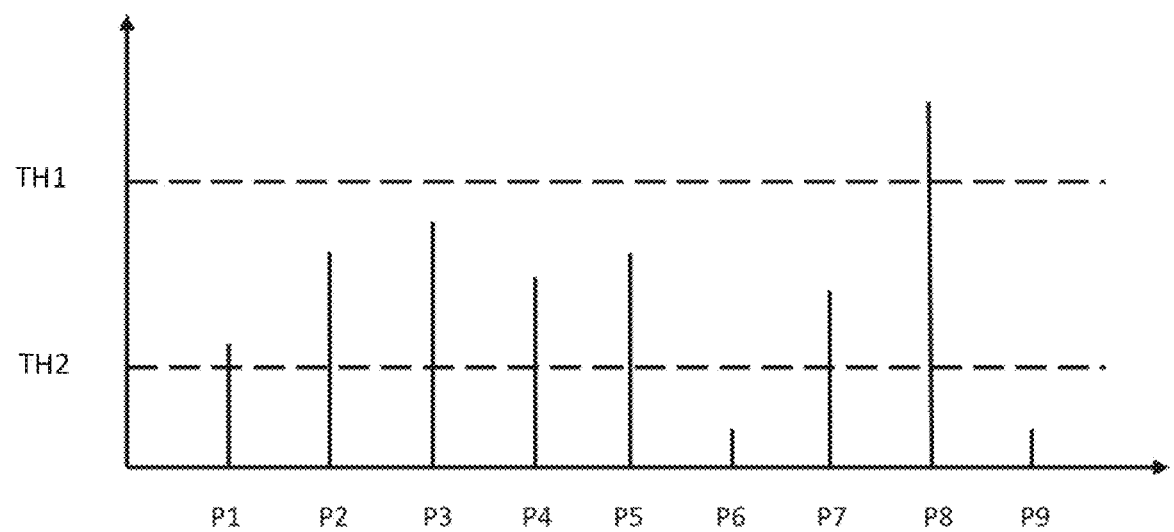
FIG. 7 illustrates a graph of example processing times per page relative to upper and lower thresholds for anomaly detection according to some embodiments.

FIG. 7 illustrates a graph 700 of sheet conveyance intervals relative to the first and second thresholds for anomaly detection according to some embodiments. The vertical axis indicates sheet conveyance interval, and the horizontal axis indicates the sheet passage that has occurred during a certain duration of time or number of sheet passages.

As shown in FIG. 7, two horizontal lines are drawn at TH1 and TH2. The line at TH1 corresponds to the first threshold above which a controller (e.g., the controller 106 in FIG. 1A) counts an anomaly, and the line at TH2 corresponds to a second threshold below which the controller counts an anomaly. In the example of FIGS. 7, P6 and P9 are below the second threshold TH2, and P8 is above the first threshold TH1, respectively.

Figure 8:
FIG. 8 illustrates a table of an example number of times a sheet conveyance interval exceeded an upper threshold and a lower threshold for specific page ranges according to some embodiments.

FIG. 8 illustrates a first threshold count CA1 indicating the number of sheet conveyance intervals that exceeded the upper threshold and a second threshold count CA2 indicating the number of sheet conveyance intervals that were lower than the lower threshold for a time duration, a page range, a number of pages, etc., according to some embodiments. As shown in FIG. 8, the first threshold count CA1 (exceeding the upper threshold TH1) and the second threshold count CA2 (below the lower threshold TH2) are totaled for each of multiple groups of pages (e.g., P1-P5 and P6-P9). The upper threshold and/or the lower threshold may or may not be the same between P1-P5 and P6-P9. As shown, page range P1-P5 had no anomalous passage intervals below the lower threshold TH2 and no anomalous passage intervals above the upper threshold TH1. Page range P6-P9 had two anomalous passage intervals below the lower threshold TH2 and one anomalous passage interval above the upper threshold TH1. Page range P10-P100 had eight anomalous passage intervals below the lower threshold TH2 and fifteen anomalous passage interval above the upper threshold TH1.

In a situation where the second threshold count CA2 is (excessively) greater than the first threshold count CA1 (CA2>CA1), it may suggest that a sheet feeding roller has excessively degraded (worn out) and not that the sheets are in improper quality or condition. In a situation where the first threshold count CA1 is (excessively) greater than the second threshold count CA2 (CA1>CA2), it may suggest that sheets are in improper quality or condition and not that the sheet feeding roller has excessively degraded (worn out). In a situation where the first threshold count CA1 is equal to or roughly equal to (e.g., +/−5%, 10%, 15%) the second threshold count CA2 (CA1≈CA2), it may suggest that the setting of a rotational rate of a sheet feeding roller and/or sheet placement of sheets to be conveyed is improper and needs adjustment.

Figure 9:
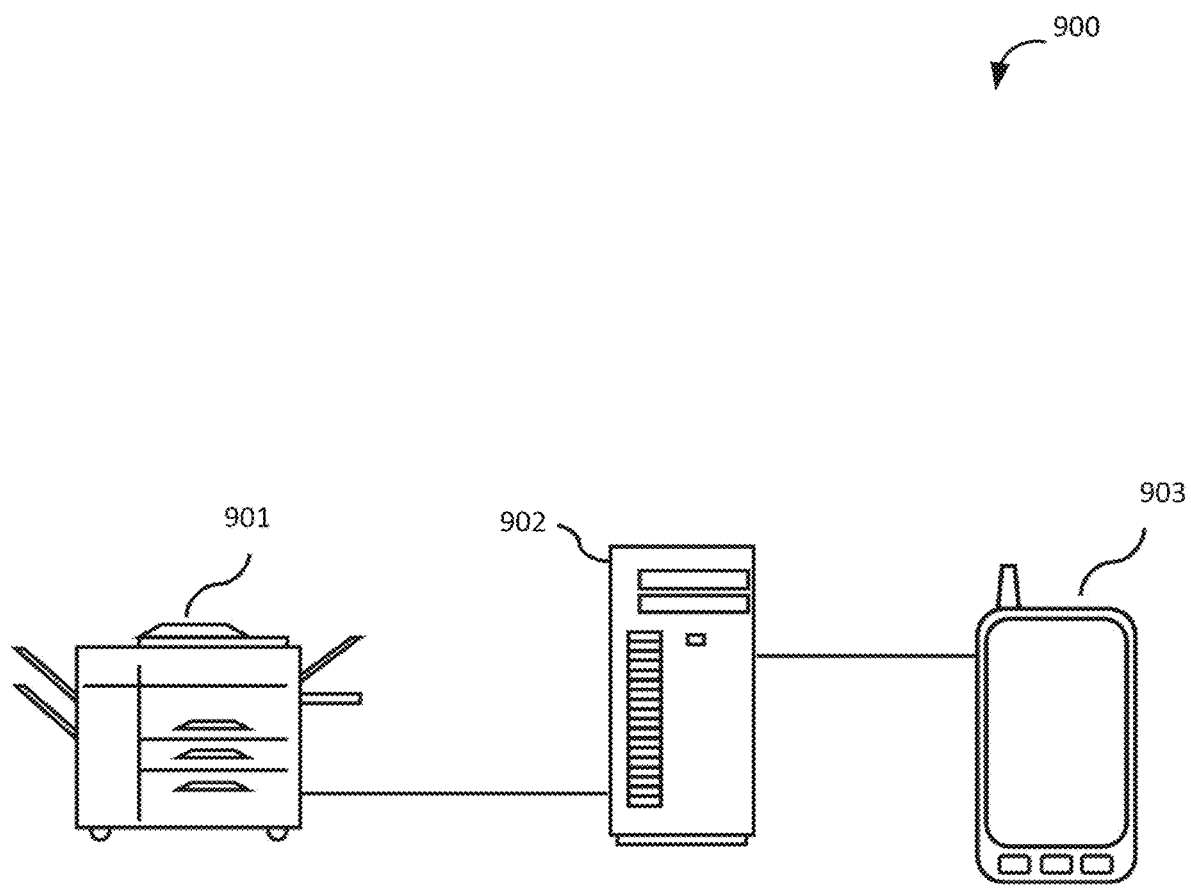
FIG. 9 illustrates an example system for identifying sheet conveyance anomalies and classifying paper according to some embodiments.

FIG. 9 illustrates an example system 900 for determining and notifying sheet conveyance anomalies according to some embodiments. In the example of the system shown in FIG. 9, the system 900 includes an image forming apparatus 901, a server apparatus 902, and/or a mobile computing device 903.

The image forming apparatus 901 is intended to represent an example sheet processing apparatus. The image forming apparatus 901 may perform image forming operations in accordance with any applicable image forming technique, including electrophotographic image forming, inkjet image forming, and so on. In some embodiments, the image forming apparatus 901 includes or is coupled to at least part of a sheet processing apparatus, such as the sheet processing apparatus 100 shown in FIG. 1A. For example, the image forming apparatus 901 includes a sheet feeding roller and a sensor configured to detect sheet passage as in the sheet processing apparatus 100 shown in FIG. 1A. In some examples, the image forming apparatus 901 also includes a controller such as the controller 106 in FIG. 1A.

The server apparatus 902 is intended to represent an apparatus configured to process data regarding sheet conveyance anomalies. In some embodiments, the server apparatus 902 is couplable to the image forming apparatus 901 through a wired and/or wireless connection and configured to receive detection signals generated by a sensor included in the image forming apparatus 901 and process the detection signals. In some embodiments, the server apparatus 902 includes a processing device configured to function as a controller such as the controller 106 in FIG. 1A.

The mobile computing device 903 is intended to represent an apparatus configured to receive data regarding sheet conveyance anomalies and present information about sheet conveyance anomalies on a display thereof. In some embodiments, the mobile computing device 903 is couplable to the server apparatus 902 through a wired and/or wireless connection and configured to generate the information about sheet conveyance anomalies based on the data received. In some embodiments, the information about sheet conveyance anomalies may include any applicable information, such as the first and second threshold counts, e.g., the numbers of times a sheet conveyance interval is out of a range (e.g., below and/or above thresholds), a notification of a sheet conveyance anomaly or situation involving a sheet conveyance anomalous situation, a location (e.g., a roller) at which the sheet conveyance anomaly is considered to have happened, a message (e.g., warning, instruction) to perform maintenance, and so on. In addition, any applicable network topology for providing notification of a sheet conveyance anomaly can be employed. For example, the mobile computing device 903 may directly receive data regarding each sheet conveyance anomaly (e.g., detection signals) from the image forming apparatus 901.

Figure 10:
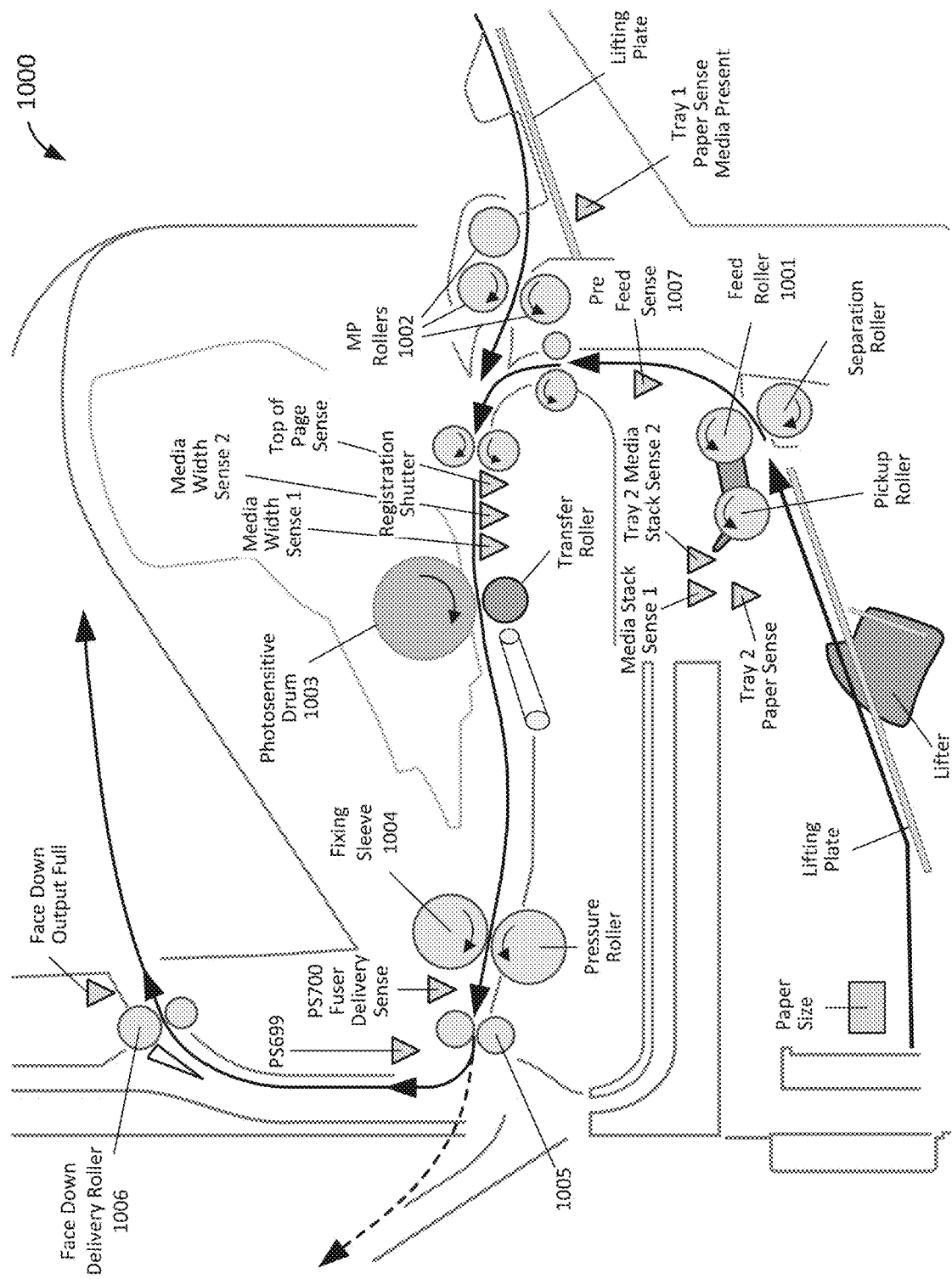
FIG. 10 illustrates an example sheet conveyance path in a sheet conveyance apparatus according to some embodiments.

FIG. 10 illustrates an example sheet conveyance path 1000 in an image forming apparatus according to some embodiments. In the example of the sheet conveyance path 1000 shown in FIG. 10, the image forming apparatus includes a first feed roller 1001, a second feed roller 1002, a photosensitive drum 1003, a fixing roller 1004, a third feed roller 1005, a fourth feed roller 1006, and a plurality of sensors 1007.

The first feed roller 1001 is intended to represent a roller configured to introduce a sheet into the image forming apparatus from a sheet holder disposed at a bottom portion thereof. In some embodiments, the first feed roller 1001 corresponds to the sheet feeding roller 303 in FIG. 3.

The second feed roller 1002 is intended to represent a roller configured to introduce a sheet into the image forming apparatus from a sheet holder (e.g., manual sheet feeder) disposed at a side portion thereof.

The photosensitive drum 1003 is intended to represent a roller configured to transfer a toner image formed thereon onto a sheet passing therethrough. Any known applicable technique can be employed for the structure and configuration of the photosensitive drum 1003.

The fixing roller 1004 is intended to represent a roller configured to fix the toner image transferred to the sheet at the photosensitive drum 1003 on the sheet, by applying heat. Any known applicable technique can be employed for the structure and configuration of the fixing roller 1004.

The third feed roller 1005 is intended to represent a roller configured to convey a sheet conveyed from the fixing roller 1004. The sheet conveyed by the third feed roller 1005 may be conveyed to a side portion of the image forming apparatus or toward a top portion of the image forming apparatus, depending on sheet processing setting.

The fourth feed roller 1006 is intended to represent a roller configured to convey a sheet conveyed from the third feed roller 1005 to a sheet exit tray formed at the top portion of the image forming apparatus.

Each of the plurality of sensors 1007 is intended to represent a sensor configured to detect passage of a sheet, and is represented by a triangle in FIG. 10. Depending upon a specific implementation and other considerations, one or more of the sensors 1007 corresponds to the sensors 104 in FIG. 1A, and detection signals from the one or more of the sensors 1007 can be used to detect a sheet conveyance anomaly at the position of the one or more of the sensors 1007. In some embodiments, the sheet conveyance anomaly can inform a user of the possibility of a defect in one or more rollers included in the image forming apparatus.

In some embodiments, the controller may compare sheet conveyance intervals at the multiple sensor positions to identify sheet interval deviation that may cause a malfunction (e.g., paper jam or printing error). The positions of a sensor identifying an anomaly may indicate a problem with the roller adjacent the sensor.

Figure 11:
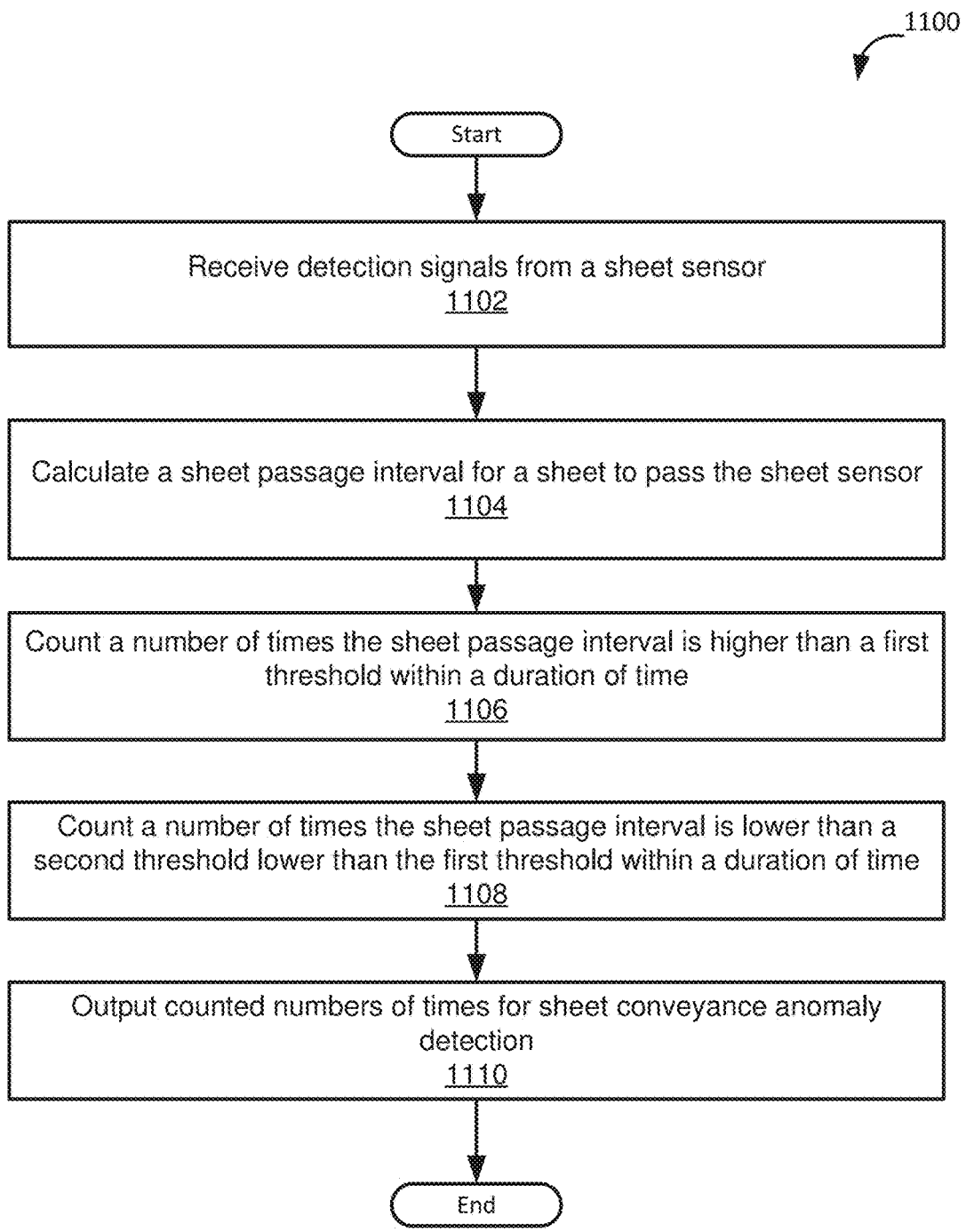
FIG. 11 illustrates a flowchart of an example of a method for operating a sheet processing apparatus according to some embodiments.

FIG. 11 illustrates a flowchart 1100 of an example of a method for operating a sheet processing apparatus. An applicable module for operating a sheet processing apparatus, such as the controller 106 in FIG. 1A, can perform steps of the flowchart 1100. The flowchart 1100 begins at step 1102 with receiving detection signals from a sheet sensor (e.g., the sheet sensor 104 in FIG. 1A). In some embodiments, the detection signals are received when a front end of a sheet passes the sheet sensor and a tail end of the sheet passes the sheet sensor.

The flowchart 1100 continues to step 1104 with calculating a sheet passage interval for the sheet to pass the sheet sensor. In some embodiments, the sheet passage interval is determined based on a time period from the time when a detection signal corresponding to passage of the front end of the sheet is received to the time when a detection signal corresponding to passage of the tail end of the sheet is received. Steps 1102 and 1104 are carried out for each of a plurality of sheets.

The flowchart 1100 continues to step 1106 with counting the number of times the sheet passage interval is higher than a first threshold within a certain duration of time or within a predetermined number of sheets. In some embodiments, the first threshold may be determined based on at least one of a type of sheet, a length of sheet in a sheet conveying direction, a rotational rate of a sheet feeding roller, and/or a cumulative number of sheet passages in the duration of time or in the predetermined number of sheets.

The flowchart 1100 continues to step 1108 with counting the number of times the sheet passage interval is lower than the second threshold within the certain duration of time or within a predetermined number of sheets. In some embodiments, the second threshold is lower than the first threshold and may be determined also based on at least one of the type of sheet, the length of sheet in the sheet conveying direction, the rotational rate of the sheet feeding roller, and/or the cumulative number of sheet passages in the duration of time or in the predetermined number of sheets.

The flowchart 1100 continues to step 1110 with outputting the counted numbers of sheet conveyance anomalies in the steps 1106 and 1108. In some embodiments, the counted numbers of sheet conveyance anomalies in the steps 1106 and 1108 are output to any applicable devices including a display coupled to or integrated with the sheet processing apparatus, a server apparatus for distribution to user devices such as a mobile phone, and/or the user device. A notification may be generated when an alert condition is satisfied, the alert condition being based on the count of anomalies exceeding the first threshold, below the second threshold, and/or deviating from others in the sheet conveyance path. Other factors may also be part of the alert condition.

Figure 12:
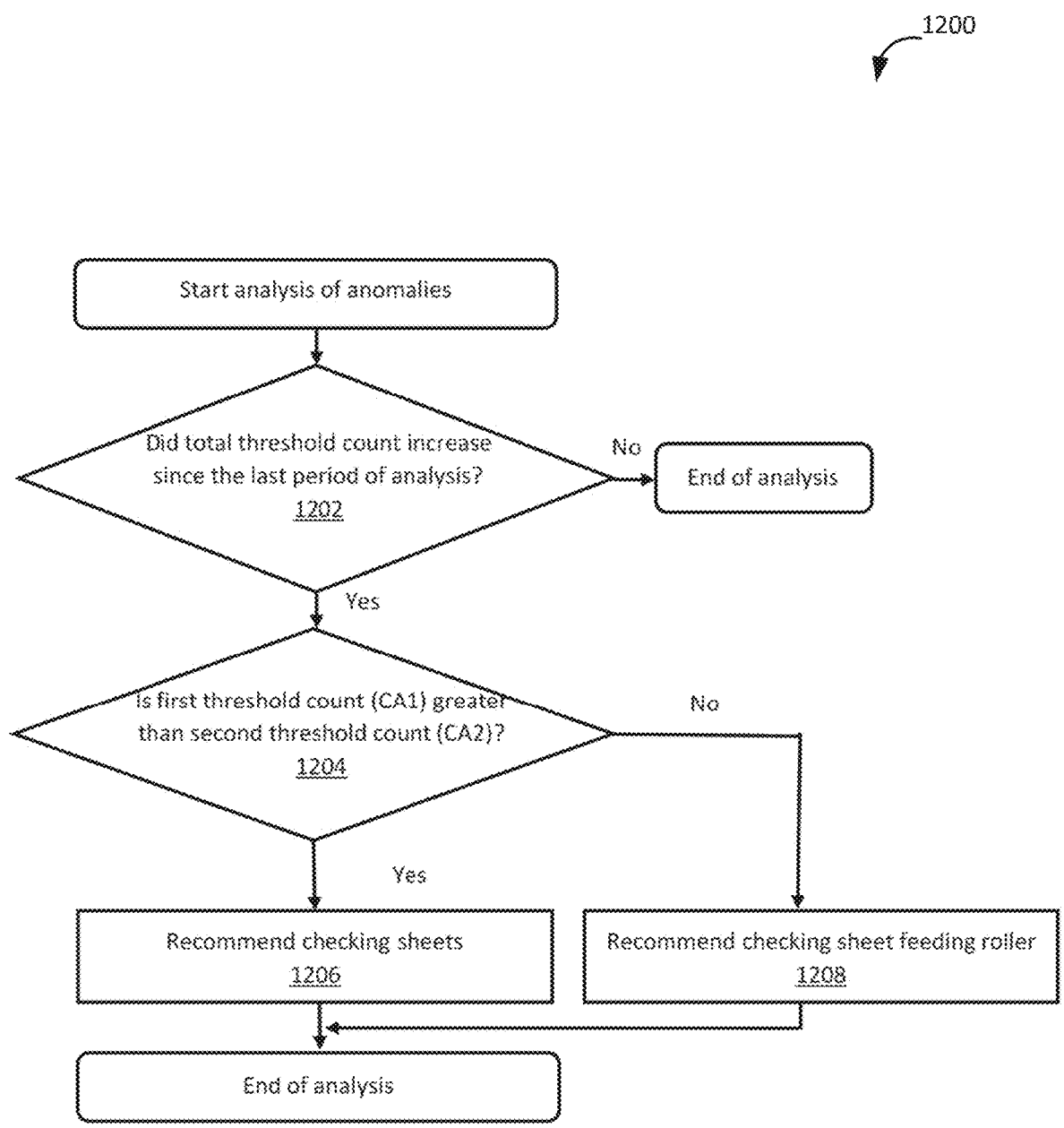
FIG. 12 illustrates a flowchart of another example of a method for operating a sheet processing apparatus according to some embodiments.

FIG. 12 illustrates a flowchart 1200 of another example of a method for operating a sheet processing apparatus according to some embodiments. An applicable module for operating a sheet processing apparatus, such as the controller 106 in FIG. 1A, can perform steps of the flowchart 1200. The flowchart 1200 begins at step 1202 with determining whether a total threshold count, which is a sum of a first threshold count (e.g., CA1 in FIG. 8) and a second threshold count (e.g., CA2 in FIG. 8), increased since the last analysis of sheet conveyance anomaly. In some embodiments, the analysis of sheet conveyance anomaly is carried out at applicable timing, such as every predetermined duration of time or in response to a triggering event, such as a user command, an excessive increase rate of a threshold count, detection of sheet jam, detection of sheet conveyance anomaly, and so on. When it is determined that the total threshold count has not increased (No in step 1202), the flowchart 1200 ends.

When it is determined that the total threshold count increased (Yes in step 1202), the flowchart 1200 continues to step 1204 with determining whether the first threshold count is greater than the second threshold count.

When it is determined that the first threshold count is greater than the second threshold count (Yes in step 1204), the flowchart 1200 continues to step 1206 with generating a control signal causing a first message recommending checking sheets, and ends the analysis. In some embodiments, the first message may specify the type of sheets to be used, orientation of the sheets, conditions of the sheets, and so on.

When it is determined that the first threshold count is not greater than the second threshold count (No in step 1204), the flowchart 1200 continues to step 1208 with generating a control signal causing a second message recommending checking sheet feeding rollers, and ends the analysis. In some embodiments, the second message may specify the type of sheets to be used, orientation of the sheets, conditions of the sheets, and so on.

Figure 13:
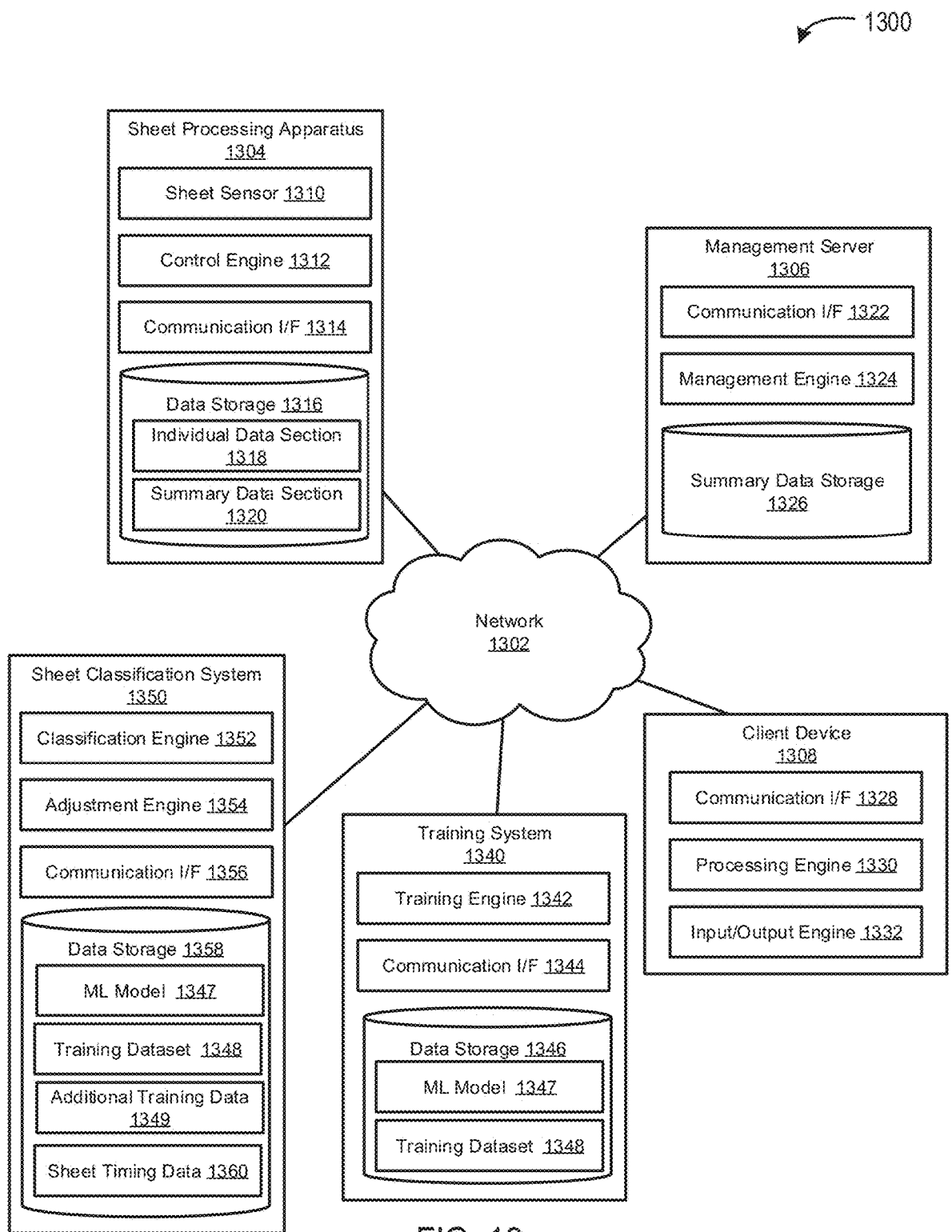
FIG. 13 illustrates a schematic example of a system for managing a sheet processing apparatus according to some embodiments.

FIG. 13 illustrates a schematic example of a system 1300 for managing a sheet processing apparatus according to some embodiments. In the example of the system shown in FIG. 13, the system 1300 includes a network 1302, a sheet processing apparatus 1304, a management server 1306, a client device 1308, a training system 1340, and a sheet classification system 1350, each coupled to the network 1302.

In the example of the network system 1300 shown in FIG. 13, the network 1302 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In some embodiments, the wireless communication includes one or more of long-range wireless communication based on GSM, W-CDMA and/or CDMA2000 (3G), IEEE 802.16 (e.g., WiMAX, 4G LTE, etc.), IEEE 802.11 (e.g., WiFi, 5G), and so on. According to various implementations, the components described herein may be implemented in hardware and/or software that configures hardware.

In the example of the network system 1300 shown in FIG. 13, the sheet processing apparatus 1304 is configured to perform sheet processing, such as printing, folding, stapling, etc. on one or more sheets conveyed therethrough. The sheet processing apparatus 1304 may correspond to a sheet processing apparatus part of which are described above in FIGS. 1A-3 and/or FIG. 9. As shown, the sheet processing apparatus 1304 includes a sheet sensor 1310, a control engine 1312, a communication interface (I/F) 1314, and data storage 1316. The sheet sensor 1310 is configured to detect passage of a sheet as the sheet is conveyed by a conveyance roller, and may correspond to the sensor 104 in FIG. 1A. The control engine 1312 is configured to control the overall operations of the sheet processing apparatus 1304. An example of a detailed operation of the control engine 1312 is described below with reference to FIG. 14. In the example of the system shown in FIG. 13, the control engine 1312 may include one or more processors, one or more storage devices, and/or other components. In some embodiments, the processors are programmed by one or more computer program instructions stored on the storage device. As used herein, for convenience, the various applicable instruction modules will be described as performing an operation, when, in fact, various applicable instructions program the processors to perform the various applicable operations. The communication interface (I/F) 1314 is configured to perform communication with external devices based on commands from the control engine 1312.

The data storage 1316 is configured to store sheet-conveyance datasets, such as individual sheet-conveyance datasets and summary sheet-conveyance datasets. The data storage 1316 includes an individual data section 1318 for storing the individual sheet-conveyance datasets, and a summary data section 1320 for storing the summary sheet-conveyance datasets. The data storage 1316 may be a detachable storage device, such as a flash memory card (e.g., SD card), a USB memory stick, an external hard disk drive (HDD), and other applicable external storage devices.

In the example of the system shown in FIG. 13, the management server 1306 is one or more computer systems configured to manage operations of the sheet processing apparatus 1304, training system 1340, and/or sheet classification system 1350. The management server 1306 may correspond to the server apparatus 902 in FIG. 9. Specifically, the management server 1306 includes a communication interface (I/F) 1322, a management engine 1324, and summary data storage 1326. The communication interface (I/F) 1322 is configured to perform communication with external devices based on commands from the management engine 1324. The management engine 1324 is configured to control the overall operations of the management server 1306, and may have the same or similar configuration as the control engine 1312 of the sheet processing apparatus 1304. The summary data storage 1326 is configured to store summary sheet-conveyance datasets, which may be received from the sheet processing apparatus 1304. An example of a detailed operation of the management server 1306 is described below with reference to FIG. 15. In some embodiments, the management server 1306 includes some or all of the functionality of the training system 1340 and/or sheet classification system 1350.

In the example of the system shown in FIG. 13, the client device 1308 is a computing device configured to receive communication regarding the sheet processing apparatus 1304 from the sheet processing apparatus 1304 and/or the management server 1306. In some embodiments, the client device 1308 may correspond to the mobile computing device 903 in FIG. 9. Specifically, the client device 1308 includes a communication interface (I/F) 1328, a processing engine 1330, and an input/output engine 1332. The communication interface (I/F) 1328 is configured to perform communication with external devices based on commands from the processing engine 1330. The processing engine 1330 is configured to control the overall operations of the client device 1308, and may have the same or similar configuration as the control engine 1312 of the sheet processing apparatus 1304 and/or the management engine 1324 of the management server 1306. The input/output engine 1332 is configured to manage inputs from and outputs to local devices/modules connected to the client device 1308, such as a display device, a physical or virtual keyboard, and a speaker, etc. An example of a detailed operation of the client device 1308 is described below with reference to FIG. 16.

In the example of the network system 1300 shown in FIG. 13, the training system 1340 is configured to generate training data 1342 and/or train a machine learning model 1347 for classifying sheets (e.g., sheets of paper). As shown, the training system 1340 includes a training engine 1342, a communication interface (I/F) 1344, and a data storage 1346. In one example, the training engine 1342 generates training data 1348 using one or more test devices (e.g., a sheet processing apparatus and/or other image forming apparatus) in a test environment. The training data 1348 may be used as input for the machine learning model, such as a K-Nearest Neighbor (KNN) model, logistic regression model, and/or other supervised machine learning model). The data storage 1340 may store the generated training dataset 1342 and the machine learning model(s) 1347. The communication interface (I/F) 1344 may be configured to perform communication with external devices based on commands from the training engine 1342.

In some embodiments, K-nearest neighbors and logistic regression are examples of supervised learning techniques used in classification that may be implemented by the machine learning model 1347. Generally, in supervised learning, a training data set is labeled (e.g., "premium" or "economy"). The machine learning model determines the label of an unseen instance based on labeled training data. K nearest neighbors may use training data to classify new instances based on a similarity measure and/or threshold.

In some embodiments, Number of Neighbors (K) is a parameter used in a KNN classifier. The classifier may assign a classification label which is most frequent among the K training samples nearest to that query point (e.g., distance functions). It may be a majority vote.

In some embodiments, logistic regression is a statistical model that classifies unseen cases into two possible values (or, binary outcomes), such 0/1, pass/fail, A/B, and/or the like. In some of the examples presented herein, "economy" or "premium" are the possible values. The classifier may be a logistic function. In the example machine learning techniques described elsewhere herein, K-Nearest Neighbors is used, however logistic regression may also be appropriate when there are two categories are used for classification.

In the example of the network system 1300 shown in FIG. 13, the sheet classification system 1350 is configured to classify sheets (e.g., sheets of paper). As shown, the sheet classification system 1350 includes a classification engine 1352, an adjustment engine 1354, a communication interface (I/F) 1356, and a data storage 1358. The sheet classification engine 1352 may utilize a machine learning model 1364 to predict a classification (e.g., economy paper, premium paper), and classify the sheets according to the prediction. For example, the classification engine 1352 may come pre-loaded (e.g., during manufacturing) with the training dataset 1348 and/or machine learning model 1364, and the machine learning model 1364 may use the training dataset 1348 as input to predict classification(s) for sheets passing through a deployed device (e.g., a deployed sheet processing apparatus 1304 and/or other image forming apparatus).

The adjustment engine 1354 may be configured to adjust operational parameters of a deployed device based on the predicted sheet classification. For example, the adjustment engine 1354 may adjust image quality, enhance toner usage, prolong life of a components (e.g., printer cartridges, rollers, optical devices, and/or the like). The communication interface (I/F) 1350 may be configured to perform communication with external devices based on commands from the classification engine 1352 and/or adjustment engine 1354.

It should be appreciated that although the various instructions are illustrated in FIG. 13 as being co-located within a single processing unit, in implementations in which processor(s) includes multiple processing units, one or more instructions may be executed remotely from the other instructions. Additionally, the modular software breakdown as illustrated in FIG. 13 is prepared for illustrative purposes only. The various instructions described with respect to specific software modules may be implemented by alternative software modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) may be programmed by one or more additional instructions that may perform some or all of the functionality attributed herein to one of the instructions.

The various instructions described herein may be stored in a storage device, which may comprise random access memory (RAM), read only memory (ROM), and/or other memory. The storage device may store the computer program instructions (e.g., the aforementioned instructions) to be executed by the processor(s) as well as data that may be manipulated by the processor(s). The storage device may comprise floppy disks, hard disks, optical disks, tapes, or other storage media for storing computer-executable instructions and/or data.

Figure 14A:
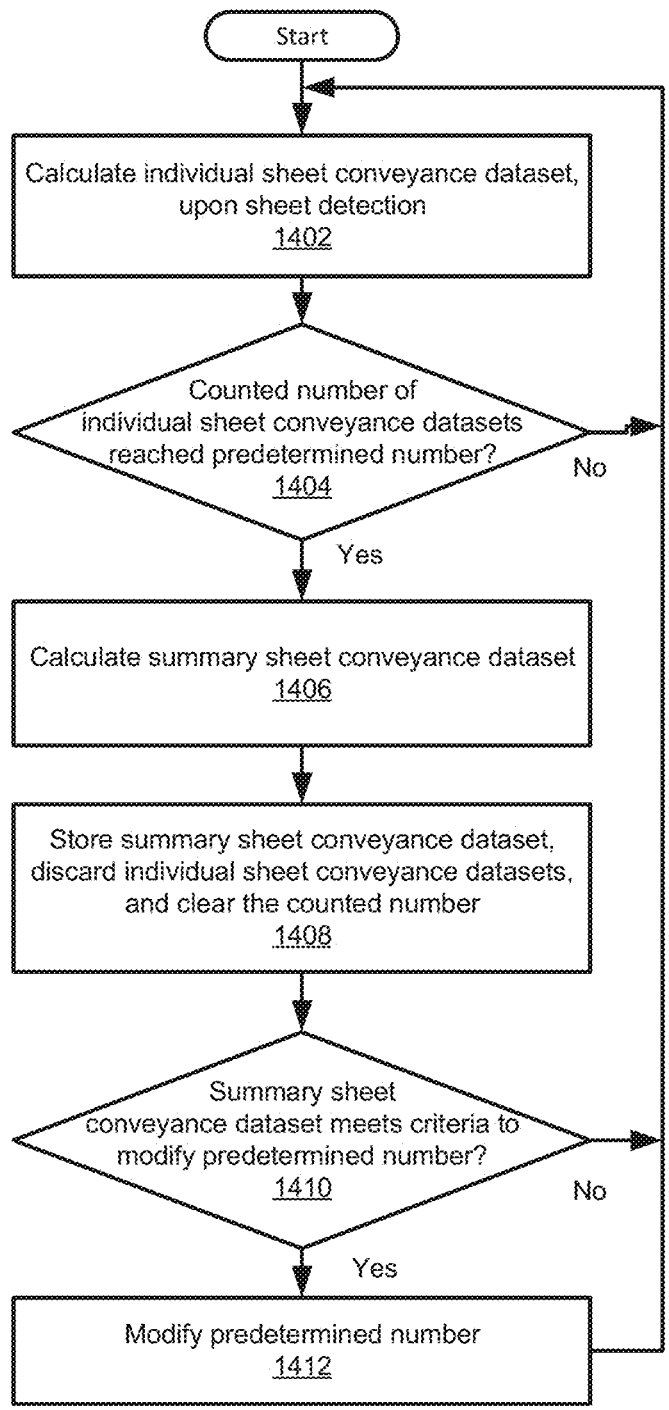
FIGS. 14A and 14B illustrate a flowchart of an example of a method for operating a sheet processing apparatus according to some embodiments.
Figure 14B:
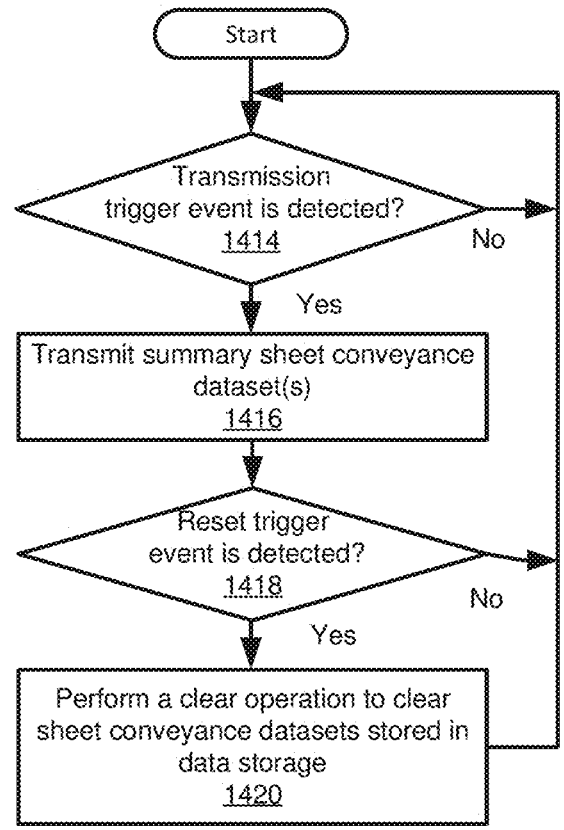

FIGS. 14A and 14B illustrate a flowchart 1400A and 1400B of an example of a method for operating a sheet processing apparatus according to some embodiments. An applicable engine for operating a sheet processing apparatus, such as the control engine 1312 of the sheet processing apparatus 1304 in FIG. 13, can perform steps of the flowchart 1400. The flowchart 1400A includes a flow of steps 1402 to 1412 (first flow), the flowchart 1440B includes a flow of steps 1414 to 1420 (second flow) in parallel. Depending on the specific implementation, the two flows may be carried out in series or in an interleaved manner. The first flow of the flowchart 1400A begins at step 1402 with calculating an individual sheet-conveyance dataset, upon sheet detection of a sheet. In some embodiments, the individual sheet-conveyance dataset may indicate a sheet passage interval corresponding to the sheet, and may be stored in an applicable section of data storage such as the individual data section 1318 in the data storage 1316 in FIG. 13. For example, an individual sheet-conveyance dataset may solely include a datapoint representing a sheet passage interval. In another example, an individual sheet-conveyance dataset may include a datapoint representing a sheet passage interval, a datapoint representing a sheet identification number, and a datapoint representing the current time (e.g., time of generating the individual sheet-conveyance dataset). Here, a "datapoint" may refer to a certain metric value, and a "dataset" may refer to one or more datapoints. Each time an individual sheet-conveyance dataset is calculated upon sheet detection, a counter is incremented to indicate the number of individual sheet-conveyance datasets that have been calculated.

The first flow of the flowchart 1400A continues to step 1404 with determining whether or not a counted number of individual sheet-conveyance datasets reached a threshold number. In some embodiments, the threshold number is variably set, and a default threshold number may be set. For example, the default threshold number is 100, and the threshold number may be increased or decreased depending on sheet conveyance performance statics calculated as described below. When it is determined that the counted number of individual sheet-conveyance datasets reached the threshold number (Yes in step 1404), the process proceeds to step 1406; otherwise, the process returns to step 1402.

The first flow of the flowchart 1400A continues to step 1406 with calculating a summary sheet-conveyance dataset based on the threshold number of individual sheet-conveyance datasets. In some embodiments, the summary sheet-conveyance dataset may include sheet passage interval statistics, such as the predetermined number, an average sheet passage interval of the predetermined number, a standard deviation of the sheet passage intervals of the predetermined number, a 25 percentile sheet passage interval, a 75 percentile sheet passage interval, the number of sheet passage intervals that exceeded an upper threshold interval, an average of sheet passage intervals that exceeded the upper threshold interval, the number of sheet passage intervals below a lower threshold interval, and an average of sheet passage intervals below the lower threshold interval. In some embodiments, the upper threshold interval and/or the lower threshold interval may be determined according to a type of a corresponding sheet conveyance roller, and may be adjusted depending on various applicable criteria, such as the average sheet passage interval. For example, a summary sheet-conveyance dataset may include one or more of the sheet passage interval statistics listed above. In another example, a summary sheet-conveyance dataset may include one or more of the sheet passage interval statistics listed above and/or individual sheet-conveyance datasets of some of the corresponding sheets, such as individual sheet-conveyance datasets with large deviation from the average sheet passage interval.

In some embodiments, a data size of the summary sheet-conveyance dataset may be smaller than a data size of the individual sheet-conveyance datasets based on which the summary sheet-conveyance dataset was calculated. To reduce the data size of the summary sheet-conveyance dataset, the summary sheet-conveyance dataset may be compressed using an applicable data compression algorithm. In some embodiments, noise reduction is carried out with respect to the summary sheet-conveyance dataset. For example, when there is structural data artifacts, such as shift in data for a limited duration of time, the problematic data is shifted back to an expected position.

The first flow of the flowchart 1400A continues to step 1408 with storing the summary sheet-conveyance dataset, discarding individual sheet-conveyance datasets based on which the summary sheet-conveyance dataset was calculated, and clearing the counted number. In some embodiments, the summary sheet-conveyance dataset is stored in an applicable section of data storage such as the summary 1320 in the data storage 1316 in FIG. 13. "Discard" here may or may not involve permanently deleting data. By storing the summary sheet-conveyance dataset and discarding the individual sheet-conveyance datasets, it is possible to save storage space for sheet-conveyance datasets.

The first flow of the flowchart 1400A continues to step 1410 with determining whether or not the summary sheet-conveyance dataset meets criteria to modify the predetermined number. In some embodiments, the criteria to modify the predetermined number may include an event when the sheet passage interval statistics indicate that the number of sheets conveyed abnormally slowly or quickly among the predetermined number of sheets is greater than a first threshold value (e.g., 5% of the predetermined number). In some embodiments, the criteria to modify the predetermined number may include an event when the sheet passage interval statistics indicate that the number of sheets conveyed abnormally slowly or quickly among the predetermined number of sheets is less than a second threshold value (e.g., 0). The second threshold value may be smaller than the first threshold value. Depending on a specific implementation, the first and/or the second threshold values may be fixed or variable. When it is determined that the summary sheet-conveyance dataset meets the criteria to modify the predetermined number (Yes in step 1410), the process proceeds to step 1412; otherwise the process returns to step 1402.

The first flow of the flowchart 1400A continues to step 1412 with modifying the predetermined number. In some embodiments, the predetermined number is decreased when the sheet passage interval statistics indicate that the number of sheets conveyed abnormally slowly or quickly among the predetermined number of sheets is greater than the first threshold value. In some embodiments, the predetermined number is increased when the sheet passage interval statistics indicate that the number of sheets conveyed abnormally slowly or quickly among the predetermined number of sheets is less than the second threshold value. In some embodiments, the predetermined number may be decreased by a first predetermined ratio (e.g., 50%), and increased by a second predetermined ratio. For example, for an original predetermined number of 100 and a first predetermined ratio of 50%, the increased predetermined number may be raised from 100 to 150. The first predetermined ratio may be equal to the second predetermined ratio. In some embodiments, the predetermined number may be decreased by a first predetermined number (e.g., 100), and increased by a second predetermined number. For example, for an original predetermined number of 100 and a first predetermined number of 100, the increased predetermined number may be raised from 100 to 200. The first predetermined number may be equal to the second predetermined number. The upper limit and/or the lower limit of the predetermined number may be set. After step 1412, the process returns to step 1402.

The second flow of the flowchart 1400B continues to step 1414 with determining whether or not a transmission trigger event is detected. In some embodiments, the transmission trigger event includes at least one of an event when a predetermined scheduled time (e.g., 0:00 AM) is reached, an event when a user instruction is received, and an event when a control signal to notify an error is generated. Depending on a specific implementation, the predetermined scheduled time may be set by a user. The control signal may be generated, for example, when a sheet jam and/or a sheet conveyance anomaly is detected. When it is determined that the transmission trigger event is detected (Yes in step 1414), the process proceeds to step 1416; otherwise the process returns to step 1414.

The second flow of the flowchart 1400B continues to step 1416 with transmitting summary sheet-conveyance dataset(s) stored in data storage. In some embodiments, all summary sheet-conveyance datasets stored in data storage, such as the summary data section 1320 of the data storage 1316 in FIG. 13, may be transmitted. In some embodiments, one or more summary sheet-conveyance datasets that are stored in the storage and have not been transmitted may be transmitted. The summary sheet-conveyance dataset may be transmitted to a management server, such as the management server 1306 in FIG. 13, and/or to a client device, such as the client device 1308 in FIG. 13.

The second flow of the flowchart 1400B continues to step 1418 with determining whether or not a reset trigger event is detected. In some embodiments, the reset trigger event may include an event when a particular roller of a sheet processing apparatus is replaced with a replacement roller. When it is determined that the reset trigger event is detected (Yes in step 1418), the process proceeds to step 1420; otherwise the process returns to step 1414.

The second flow of the flowchart 1400B continues to step 1420 with performing a clear operation to clear sheet-conveyance datasets stored in data storage. In some embodiments, the clear operation involves clearing individual sheet-conveyance datasets stored in data storage, and/or clearing summary sheet-conveyance datasets stored in data storage. Depending on a specific implementation, clearing may or may not involve permanently deleting data. After step 1420, the process returns to step 1414.

Figure 15:
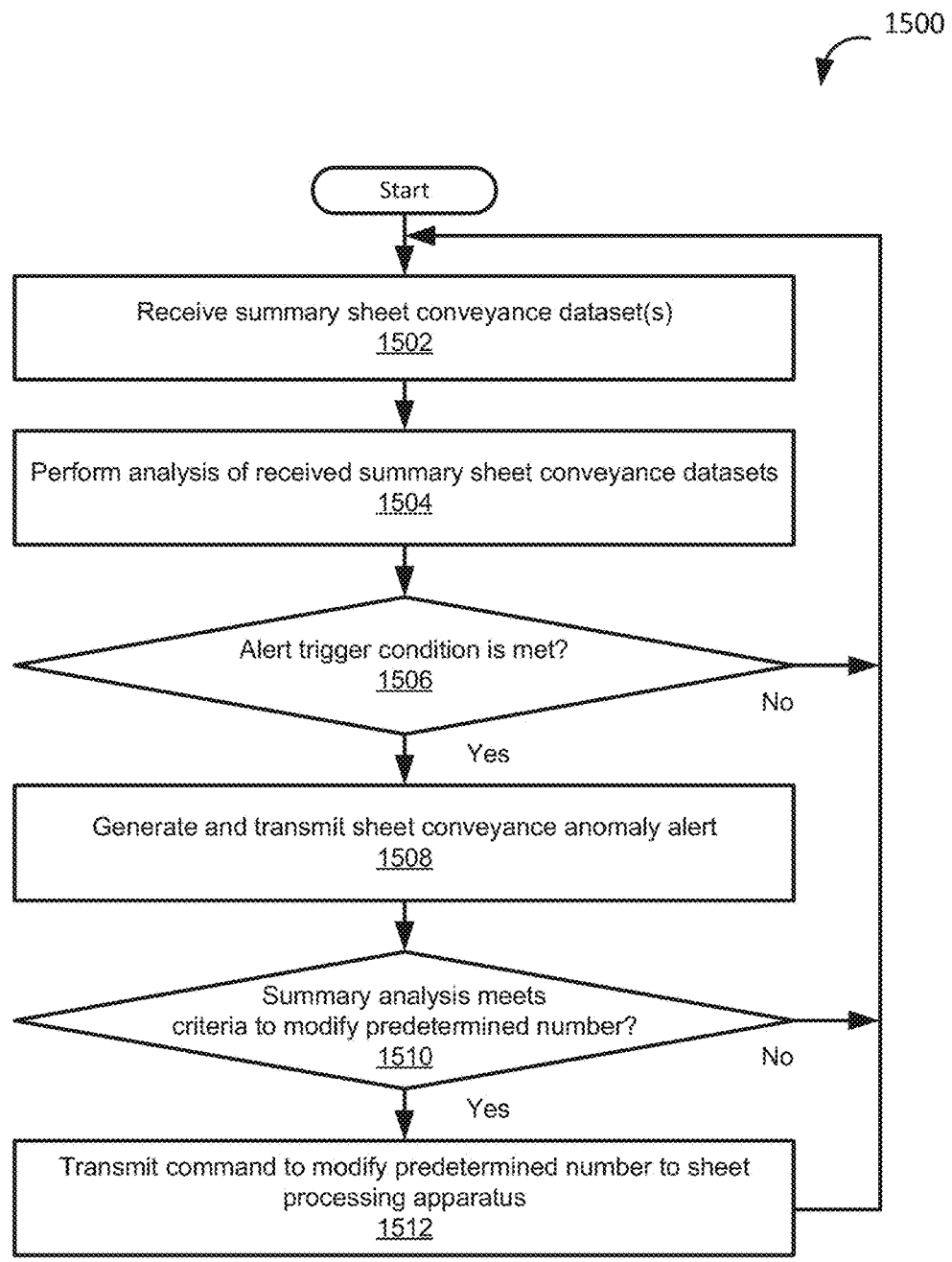
FIG. 15 illustrates a flowchart of an example of a method for operating a management server according to some embodiments.

FIG. 15 illustrates a flowchart 1500 of an example of a method for operating a management server according to some embodiments. An applicable engine for operating a management server, such as the management engine 1324 of the management server 1306 in FIG. 13, can perform steps of the flowchart 1500. The flowchart 1500 begins at step 1502 with receiving one or more summary sheet-conveyance datasets from a sheet processing apparatus. The received summary sheet-conveyance dataset(s) may be stored in applicable data storage, such as the summary data storage 1326 in FIG. 13.

The flowchart 1500 continues to step 1504 with performing an analysis of the received summary sheet-conveyance dataset(s). In some embodiments, the analysis of the received summary sheet-conveyance dataset(s) is carried out to detect sheet conveyance anomalies. For example, the analysis of the received summary sheet-conveyance dataset(s) may include analysis of one or more datapoints included in the received summary sheet-conveyance dataset(s), such as the standard deviation, the 25 percentile sheet passage interval, and the 75 percentile sheet passage interval, to detect sheet conveyance anomalies. In detecting sheet conveyance anomalies, the one or more datapoints may be compared with reference datapoints (standard datapoints) representing a normal sheet conveyance state.

The flowchart 1500 continues to step 1506 with determining whether or not an alert trigger condition is met. In some embodiments, the alert trigger condition may include an event when the number of sheets conveyed abnormally slowly or quickly is greater than a threshold value. For example, a number of sheet passage intervals lower than the 25 percentile sheet passage interval may indicate abnormally quick sheet conveyance, and a number of sheet passage intervals higher than the 75 percentile sheet passage interval may indicate abnormally slow sheet conveyance. When it is determined that the alert trigger condition is met (Yes in step 1506), the process proceeds to step 1508; otherwise the process returns to step 1502.

The flowchart 1500 continues to step 1508 with generating and transmitting a sheet conveyance anomaly alert. In some embodiments, the sheet conveyance anomaly alert may be transmitted to a corresponding sheet processing apparatus and/or a client device associated with the corresponding sheet processing apparatus.

The flowchart 1500 continues to step 1510 with determining whether or not a summary analysis meets criteria to modify a predetermined number. In some embodiments, the criteria to modify the predetermined number may or may not be the same as the criteria to modify the predetermined number employed in a sheet processing apparatus, as those in step 1410 in FIG. 14. In some embodiments, the determination whether to modify the predetermined number may be performed only by the management server.

The flowchart 1500 continues to step 1512 with transmitting a command to modify the predetermined number to a sheet processing apparatus. In some embodiments, the command causes the sheet processing apparatus that received the command to modify the predetermined number to trigger summary of individual sheet-conveyance datasets. After step 1512, the process returns to step 1502 for newly received summary sheet-conveyance dataset(s).

Figure 16:
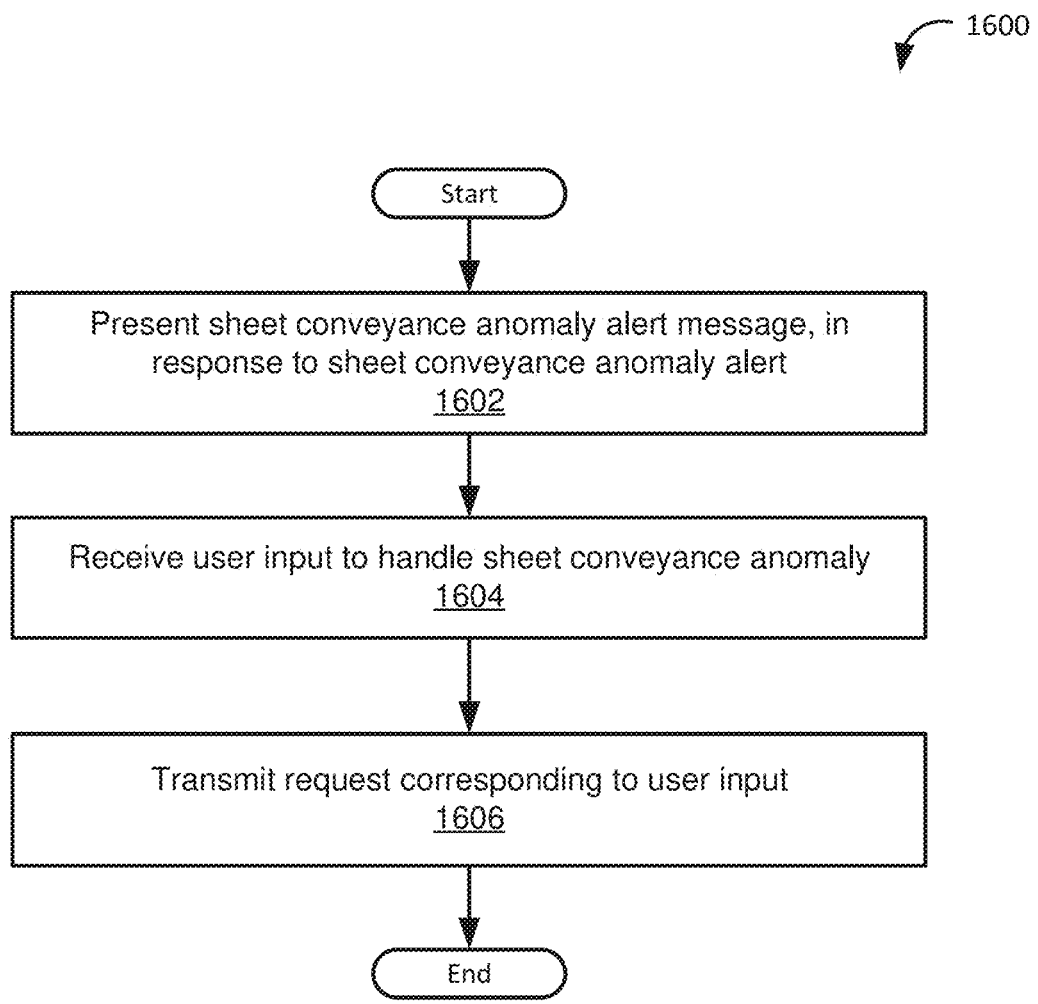
FIG. 16 illustrates a flowchart of an example of a method for operating a client device according to some embodiments.

FIG. 16 illustrates a flowchart 1600 of an example of a method for operating a client device according to some embodiments. An applicable engine for operating a management server, such as the processing engine 1330 of the client device 1308 in FIG. 13, can perform steps of the flowchart 1600. The flowchart 1600 begins at step 1602 with presenting a sheet conveyance anomaly alert message, in response to a sheet conveyance anomaly alert. In some embodiments, the sheet conveyance anomaly alert message may be displayed on a screen of a display device incorporated in or connected to a client device. For example, a message may indicate that a specific sheet conveyance roller (e.g., identified by a location) of a specific sheet processing apparatus (e.g., identified by an ID) may be causing a sheet conveyance anomaly. The message may further include a specific instruction or recommendation to handle the sheet conveyance anomaly, such as alignment adjustment or replacement of the roller.

The flowchart 1600 continues to step 1604 with receiving a user input to handle the sheet conveyance anomaly. In some embodiments, the user input is received by an applicable engine such as the input/output engine 1332 in FIG. 13. For example, a user input may be made using physical input devices, such as a keyboard, a mouse, a microphone, and so on. In another example, a user input may be made using virtual input modules, such as touch inputs on a virtual user interface on a display.

The flowchart 1600 continues to step 1606 with transmitting a request corresponding to the user input. In some embodiments, the request is transmitted from an applicable module such as the communication interface 1328 in FIG. 13 to an applicable apparatus, such as the sheet processing apparatus 1304 and/or the management server 1306 in FIG. 13. For example, the request may include a command to stop operations of a sheet processing apparatus, and/or a command to redirect sheet processing commands (e.g., print commands) to another sheet processing device. In another example, the request may include a service/maintenance request and/or a purchase request to purchase a replacement roller.

Figure 17:
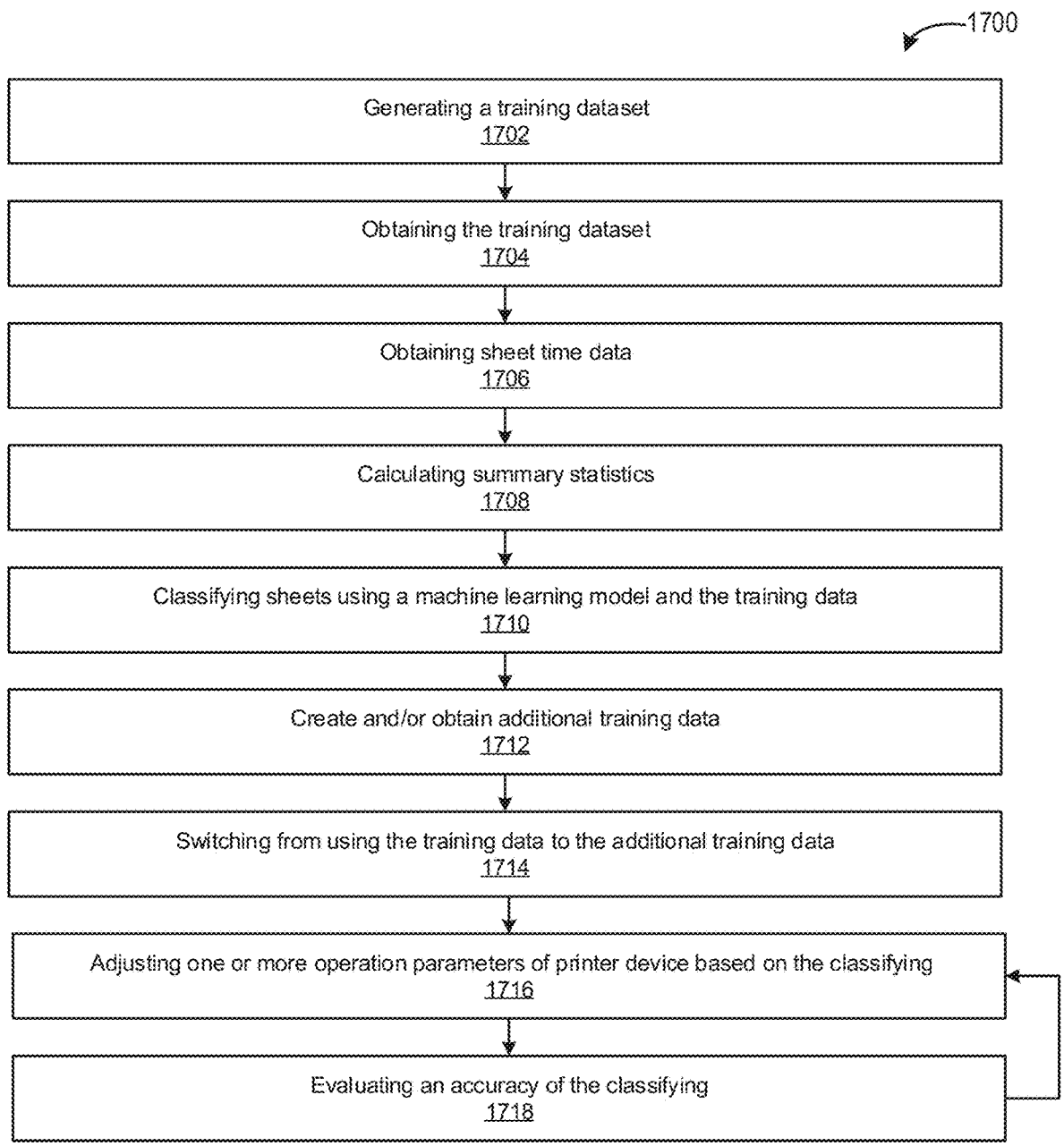
FIG. 17 illustrates a flowchart of an example of a method for classifying sheets according to some embodiments.

FIG. 17 illustrates a flowchart 1700 of an example method of classifying sheets according to some embodiments. In this and other flowcharts, the flowchart 1700 illustrates by way of example a sequence of steps. It should be understood the steps may be reorganized for parallel execution, or reordered, as applicable. Moreover, for the sake of clarity, some steps that could have been included may have been excluded and some steps that could have been excluded may have been included.

In step 1702, a training system (e.g., training system 1340) generates a training dataset (e.g., training dataset 1348). In some embodiments, a training engine (e.g., training engine 1342) generates the training dataset. Generally, during printer manufacturing, e.g., while testing and evaluating, engineers may test sheet processing apparatus by running simulations with various types of sheets. The test sheet processing apparatus may collect various technical data such as calibration timing, voltage, fuser temperature, and/or the like. This information may be stored in memory and/or written in a log file.

In some embodiments, the test sheet processing apparatus may also collect sheet timing data. The sheet timing data may include the travel time (e.g., in milliseconds) it takes a sheet to travel from point A to point B within the test sheet processing apparatus (e.g., across a sensor). The sheet travel time may depend on the condition of the rollers inside the printer, the quality of paper, moisture in the air, temperature, and/or the like. Example travel time data using premium paper is shown in FIG. 19.

In some embodiments, the training system may aggregate the sheet time data for each page interval and may calculate summary statistics (e.g., Mean, Standard Deviation, Minimum, Maximum, Percentiles, etc.).

In some embodiments, the test engineers can classify the sheet being used, and can enter sheet identifiers into the training system. In one example, sheets may be classified into "Economy" or "Premium". Such classification may be used to associate the training data with the sheet classification label (e.g., supervised learning requires labels in training data).

An example summary of statistics is shown in FIG. 20. Although there are only two sheet classifications (e.g., Premium and Economy) in this example, sheets may be classified into as several classifications. For example, sheets may be classified as "Premium", "Economy", "Glossy photo", and "Recycled paper". Sheet classifications may be associated with corresponding sheet classification labels. For example, a sheet may be classified as "Premium," and be associated (e.g., assigned, labeled) a "Premium" sheet classification label.

FIG. 20 shows sample data from a single test sheet processing apparatus. The test engineers may run simulations with many test sheet processing apparatus, so similar datasets may be available from each machine. The training data from each machine may be combined, averaged, summarized, and/or the like. The summary statistics with the sheet classifications from multiple test sheet processing apparatus may be included in the initial training dataset (e.g., training dataset 1348). The combined training dataset can be loaded into a production device's memory (e.g., memory of a sheet processing apparatus 1304), in its operating system or firmware, or uploaded to a remote server to which the machine is to be connected. Accordingly, the initial training data is available locally, in the remote server and/or in another remote device.

The training dataset may use one or more feature dimensions. The example training dataset of FIG. 20 shows five feature dimensions: Mean, Standard Deviation (SD), Median, Max, and Min. However, the machines herein may use fewer, more or different feature dimensions. In some embodiments, the page index and at least one feature dimension may be used to make a meaningful classification. In some embodiments, classification may start with one dimension and may increase the number of dimensions in steps, e.g., if the accuracy is poor.

In some embodiments, as long as training classifications (labels) are provided, data other than the summary statistics can be used as input using the same process.

In step 1704, a sheet classification system (e.g., sheet classification system 1350) obtains the training dataset (e.g., training dataset 1348). For example, the training dataset may have been pre-loaded onto the sheet classification system. In some embodiments, the sheet classification system may comprise a portion of a deployed sheet processing apparatus (e.g., sheet processing apparatus 1304) and/or other deployed image forming apparatus. The training dataset may, for example, be preloaded during manufacturing. In some embodiments, the sheet classification system may be part of a remote device, such as a remote server or other remote device, and may communicate with the sheet classification system over a communication network (e.g., communication network 1302).

In step 1706, the sheet classification system obtains sheet timing data (e.g., sheet timing data 1360). The sheet classification system may obtain the sheet timing data from a sheet processing apparatus (e.g., sheet processing apparatus 1304).

In some embodiments, the sheet processing apparatus may collect and/or modify the sheet timing data during "real-world" use of the sheet processing apparatus, and provide the sheet timing data to the sheet classification system in real-time. The sheet timing data may comprise and/or be based on information of the stored individual data section (e.g., individual data section 1318), summary data section, and/or other information generated and/or obtained by the sheet processing apparatus.

In step 1708, the sheet processing apparatus may calculate summary statistics for one or more interval windows. Each interval window may include a predetermined number of sheets (e.g., as shown in FIGS. 19 and 20).

In step 1710, the sheet classification system using a machine learning model (e.g., machine learning model 1347) to classify sheets. For example, the machine learning model may use K-Nearest Neighbors or Logistic Regression to classify sheets for each x-page window based on the initial training dataset. An example algorithm implemented by the machine learning model may use five feature dimensions (Mean, SD, Median, Max, Min), and the training data may have two classification labels (e.g., premium and economy). When there are more than two labels, the machine learning model may use K-Nearest Neighbors instead of logistic regression because the logistic regression classifiers generally make binary classifications.

In some embodiments, the summary statistics for a particular sheet range, the n-th window, is represented as a pair (Mean, SD, Median, Max, Min).

For example (318.2, 5.226854, 318, 332, 292). Let's call it $p_n$.

$$p_{100}=(318.2, 5.226854, 318, 332, 292)$$

The KNN parameter may be K=3. This may be the number of neighbors.

The KNN classifier may find three closest pairs to $p_{100}=$ (318.2, 5.226854, 318, 332, 292) among the training data set for the 100th window using the Euclidian distance metric. Given a pair in the training set $q=(q_1, q_2, q_3, q_4, q_5)$, the distance between p and q is calculated by:

$$d=\sqrt{\{(318.2-q_1)^2+(5.226854-q_2)^2+(318-q_3)^2+(332-q_4)^2+(292-q_5)^2\}}$$

Figure 23:
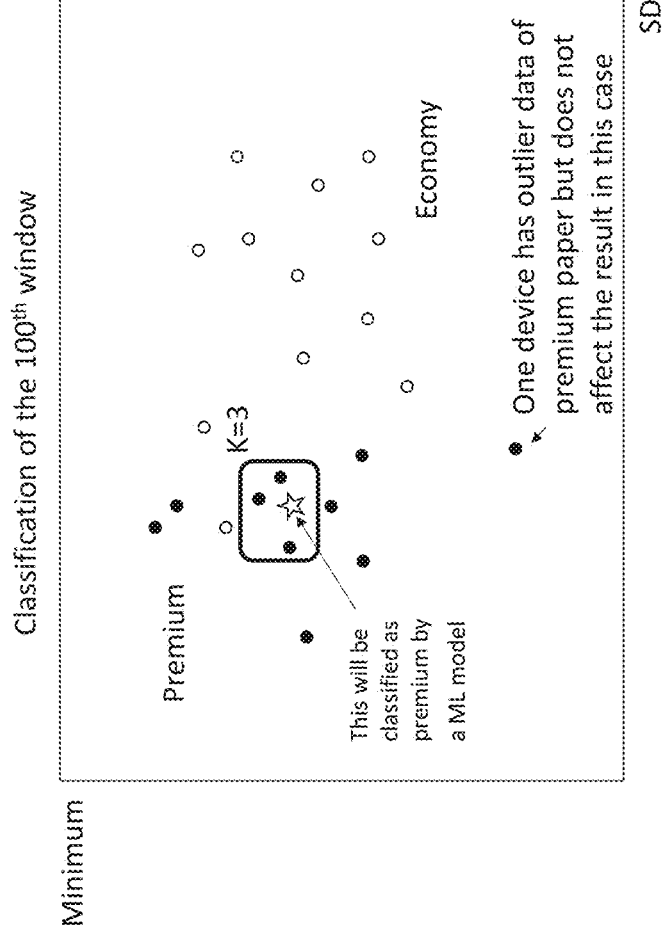
FIG. 23 illustrates an example classification of a $100^{th}$ window into premium or economy sheets according to some embodiments.

By majority vote, the classifier may classify the 100th window into premium or economy sheets. An example classification of the $100^{th}$ window is shown in FIG. 23.

In some embodiments, the classification may be performed locally (e.g., if the sheet classification system is part of the sheet processing apparatus) by a classification engine (e.g., classification engine 1352). In some embodiments, the classification may be performed remotely (e.g., if the sheet classification system is part of a remote server), and the summary information from step 1708 may have been uploaded to the remote server.

In step 1712, the sheet classification system may create and/or obtain additional training data (e.g., additional training data 1349). Although the machine may have the initial training data described above, the user or a technical dispatcher can create additional training data (e.g., additional training data 1349) that is specific to the user. To do so, the user or the dispatcher may provide sheet classification to the machine.

In some embodiments, the specific training data generated at a customer's site may be specific to the customer usage. In addition, the user may use custom classifications that are not used in the initial training data from the lab. For example, the user can use specific classifications (labels) such as "glossy photo paper," "textured photo paper," "inkjet," and/or the like. In some embodiments, the classification engine creates and/or obtains the additional training data.

In step 1714, the sheet classification system updates the original training data and/or switches to the additional training data to perform classification (e.g., instead of or in addition to the training dataset). For example, the update and/or switch may occur once a threshold amount of additional training data and/or sheet timing data has been collected. In some embodiments, the classification engine performs the update and/or switch.

In step 1716, in response to a sheet classification, the sheet classification system may adjust one or more operational parameters of the sheet processing apparatus. In some embodiments, the adjustment engine (e.g., adjustment engine 1354) performs the adjustment.

In step 1718, the sheet classification system evaluates accuracy of the classifications. For example, to evaluate the accuracy of sheet classifications, the user and/or technical dispatcher may enter the actual sheet classification into the printer's system. The classification engine may compare the predicted classification with the actual classification and may calculate prediction accuracy. An example table in FIG. 21 shows predicted and actual sheet types on the right two columns. In FIG. 21, the classification for the 561th-562th windows were incorrect.

If the classification engine determines accuracy is poor, the classification engine can attempt to improve accuracy by, for example, performing one or more of the following:
  Increasing the number of feature dimensions;
  Switching the training dataset from the original training dataset to the additional training data, if available;
  Updating the original training dataset with the additional training dataset; and/or
  If KNN is used, changing the number of neighbors (e.g., parameter K). If KNN does not improve accuracy, one or more other machine learning techniques may be used.

Steps 1716 and/or 1718 may be repeated until a desired level of accuracy is obtained.

Figure 18:
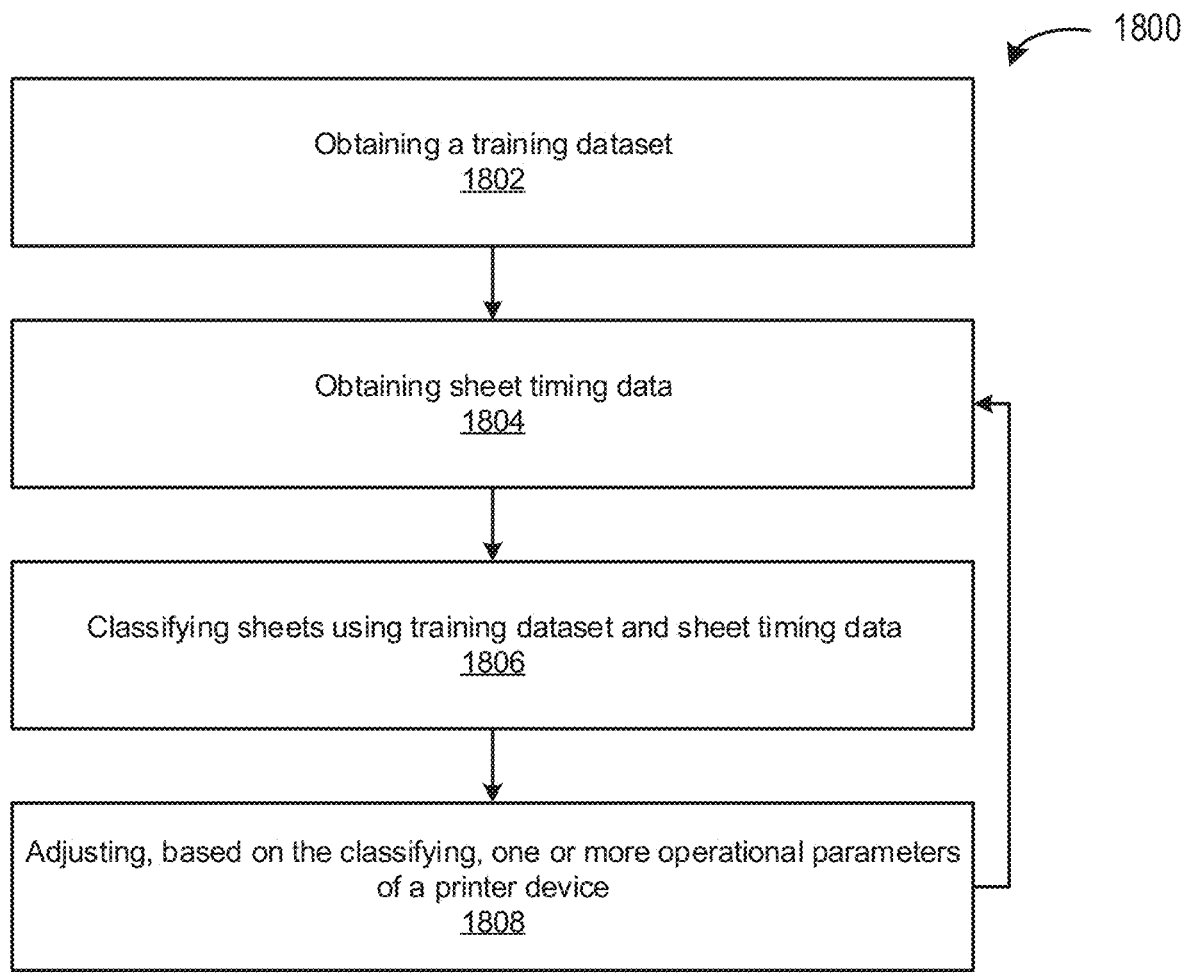
FIG. 18 illustrates a flowchart of an example of a method for classifying sheets according to some embodiments.

FIG. 18 illustrates a flowchart 1800 of an example method of classifying sheets, according to some embodiments.

In step 1802, a sheet classification system (e.g., sheet classification system 1350) obtains a training dataset (e.g., training dataset 1348). The training dataset may be obtained by a communication interface (e.g., communication interface (I/F) 1356) from a training system (e.g., training system 1340). The training dataset may come pre-loaded, along with a machine learning model (e.g., machine learning model 1347). The training dataset may comprise sheet passage interval information associated with conveyance of a plurality of sheets in a sheet conveyance path of one or more test sheet processing apparatus. At least a portion of the sheets of the plurality of sheets may have a known sheet classification (e.g., economy) of a set of sheet classifications (e.g., economy and premium). The training dataset may be generated by a training engine (e.g., training engine 1342) of a training system (e.g., training system 1340).

In step 1804, the sheet classification system obtains sheet timing data associated with the classifying. The sheet timing data may comprise sheet passage interval information associated with conveyance of the predetermined number of sheets in the sheet conveyance path of the deployed sheet processing apparatus. In some embodiments, the communication interface (I/F) obtains the sheet timing data from the deployed sheet processing apparatus.

In step 1806, the sheet classification system classifies, using a machine learning model, the training dataset and the sheet timing data, for each interval window of a plurality of different interval windows, a predetermined number of sheets in a sheet conveyance path of the deployed sheet processing apparatus as a particular classification of the set of sheet classifications. In some embodiments, a classification engine (e.g., classification engine 1352) performs the classification.

In step 1808, the sheet classification system adjusts, based on the classifying, one or more operational parameters of deployed sheet processing apparatus. In some embodiments, an adjustment engine (e.g., adjustment engine 1354) performs the adjustment.

In some embodiments, the sheet classification system comprises a portion of the deployed sheet processing apparatus. In some embodiments, the sheet classification system comprises at least a portion of a remote server coupled to the deployed sheet processing apparatus over a communication network. In some embodiments, the one or more operational parameters of the deployed sheet processing apparatus include any of image quality and toner usage.

In some embodiments, the sheet classification system may also obtain additional training data (e.g., additional training data 1349) associated with the deployed sheet processing apparatus, switch the classifying from using the original training dataset to using the additional training data (notably, in some embodiments, the additional training data may include information from the original training dataset), and/or classify, using the machine learning model and the additional training data, for each interval window of a second plurality of different second interval windows, a second predetermined number of sheets in the sheet conveyance path of the deployed sheet processing apparatus as a second classification of a second set of sheet classifications. In some embodiments, the updating of the original training data and/or switch from the original training data to the additional training data may be performed based on obtaining a threshold amount of the sheet timing data. In some embodiments, the second set of sheet classifications includes at least a portion of the set of sheet classifications and at least one additional sheet classification received by the deployed sheet processing apparatus.

In some embodiments, the sheet classification system may obtain the additional training data associated with the deployed sheet processing apparatus. The sheet classification system may switch the classifying from using the original training dataset alone to using the original training dataset and the additional training data, and may use the machine learning model to perform classifications for each interval window of a second plurality of different second interval windows, a second predetermined number of sheets in the sheet conveyance path of the deployed sheet processing apparatus as a second classification of a second set of sheet classifications.

In some embodiments, the sheet classification system may iteratively modify any of a type or number of inputs to the machine learning model until a threshold accuracy level is achieved.

In some embodiments, the sheet classification system may also evaluate accuracy of the sheet classification and/or optimize classification performance. For example, the sheet classification system may receive actual sheet classification (e.g., a user indicating an actual sheet classification of a sheet) for a particular interval window of the plurality of interval windows. The sheet classification system may compare the actual sheet classification with the determined sheet classification associated with the particular interval window of the plurality of interval windows, and determine classification accuracy based on the comparison.

FIG. 20 illustrates a table 2000 of example summary statistics with sheet classification labels according to some embodiments. In the example of FIG. 20, the summary statistics are for every 100 pages of economy paper (top) and premium paper (below) from Machine 1 with classification labels. The index of 1 means that the row includes the aggregation of the 1st to the 100th pages.

Figure 22:
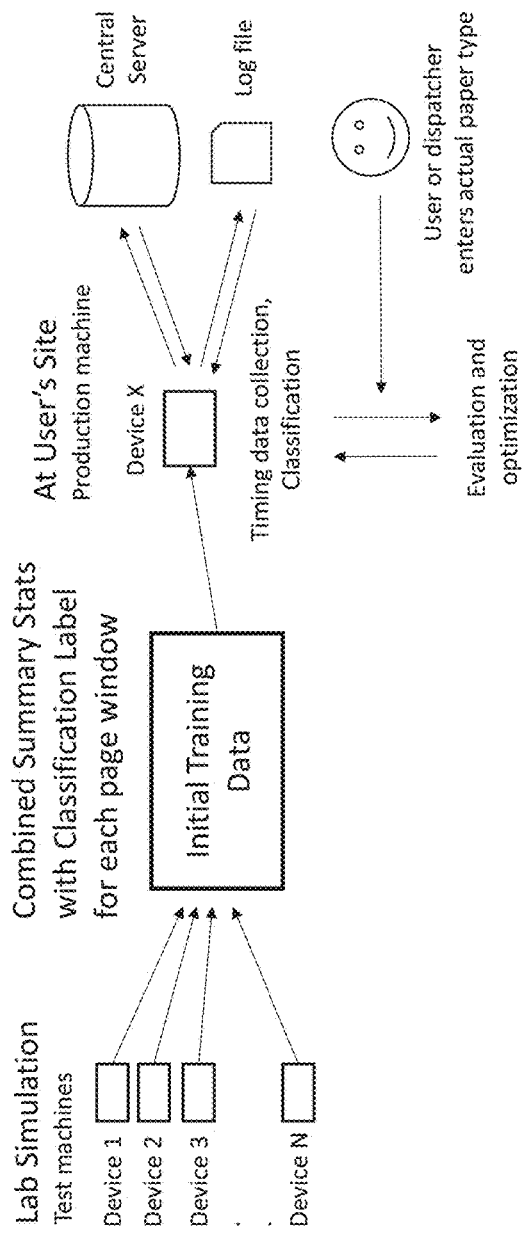
FIG. 22 illustrates a diagram of an example pipeline for sheet classification according to some embodiments.

FIG. 22 illustrates a diagram of an example pipeline 2200 for sheet classification according to some embodiments. As shown, manufacturing may perform lab simulations to generate training data (e.g., training dataset 1348) and/or a machine learning model (e.g., machine learning model 1347). The training data may include a combination of a summary statistics and classification label(s) for each page window. The training data may be provided to a user site or loaded onto a sheet processing apparatus 1304 (before or after deployment). The sheet processing apparatus may collect additional timing data and/or obtain additional classification from users to generate additional training data (e.g., additional training data 1349). The sheet classification system (e.g., sheet classification system 1350) may classify sheets based on the machine learning model. As stated herein, the sheet classification system may be part of the sheet processing apparatus and/or a remote server.

Hardware Implementation

The techniques described herein can be implemented using one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 24:
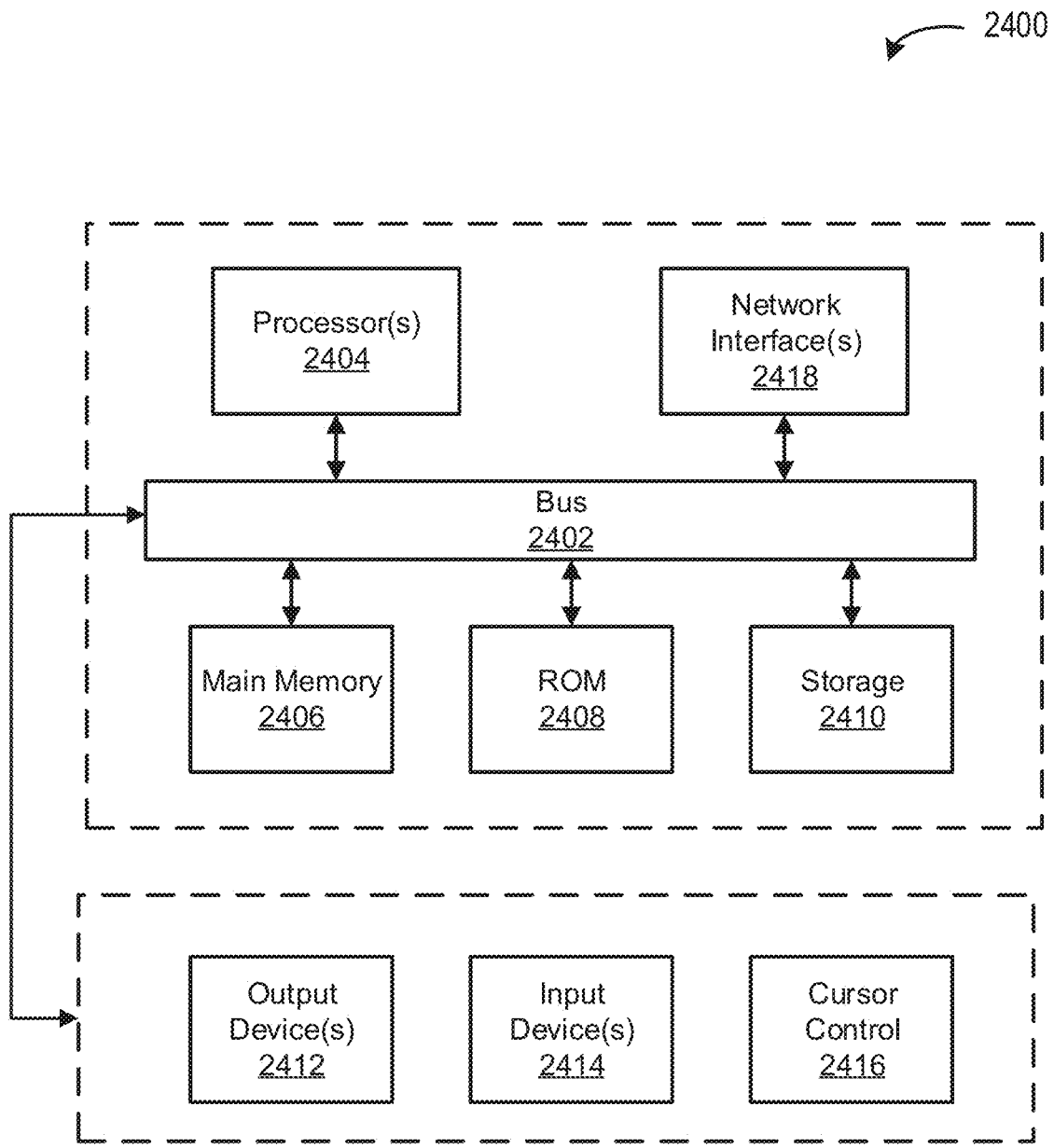
FIG. 24 illustrates a block diagram of an example computer system upon which the various embodiments described herein may be implemented.

FIG. 24 illustrates a block diagram that illustrates a computer system 2400 upon which computer-based processing involved in embodiments described herein may be implemented. In some embodiments, the computer system 2400 can be employed as the controller 106 in FIG. 1A, a main control module of the image forming apparatus 901, a main control module of the server apparatus 902, and/or a main control module of the mobile computing device 903 in FIG. 9. In some embodiments, the computer system 2400 can be employed as one or more engines in FIG. 13. The computer system 2400 includes a bus 2402 or other communication mechanism for communicating information, one or more hardware processors 2404 coupled with bus 2402 for processing information. Hardware processor(s) 2404 may be, for example, one or more general purpose microprocessors.

The computer system 2400 also includes a main memory 2406, such as a random access memory (RAM), cache and/or other dynamic storage devices, coupled to bus 2402 for storing information and instructions to be executed by processor 2404. Main memory 2406 also may be used for storing temporary variables or other intermediate information during execution of instructions to be executed by processor 2404. Such instructions, when stored in storage media accessible to processor 2404, render computer system 2400 into a special-purpose machine that is customized to perform the operations specified in the instructions.

The computer system 2400 further includes a read only memory (ROM) 2408 or other static storage device coupled to bus 2402 for storing static information and instructions for processor 2404. A storage device 2410, such as a magnetic disk, optical disk, or USB thumb drive (Flash drive), etc., is provided and coupled to bus 2402 for storing information and instructions.

The computer system 2400 may be coupled via bus 2402 to a display 2412, such as a cathode ray tube (CRT) or LCD display (or touch screen), for displaying information to a computer user. An input device 2414, including alphanumeric and other keys, is coupled to bus 2402 for communicating information and command selections to processor 2404. Another type of user input device is cursor control 2416, such as a mouse, a trackball, or cursor direction keys for communicating direction information and command selections to processor 2404 and for controlling cursor movement on display 2412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 2400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 2400 may implement the techniques described herein using customized hard-wired logic, one or more ASICs or FPGAs, firmware and/or program logic which in combination with the computer system causes or programs computer system 2400 to be a special-purpose machine. According to one embodiment, the techniques herein are performed by computer system 2400 in response to processor(s) 2404 executing one or more sequences of one or more instructions contained in main memory 2406. Such instructions may be read into main memory 2406 from another storage medium, such as storage device 2410. Execution of the sequences of instructions contained in main memory 2406 causes processor(s) 2404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 2410. Volatile media includes dynamic memory, such as main memory 2406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 2402. Transmission media can also take the form of acoustic or light waves, such as those generated during radio-wave and infra-red data communications.

Various forms of media may be involved in carrying one or more sequences of one or more instructions to processor 2404 for execution. For example, the instructions may initially be carried on a magnetic disk or solid state drive of a remote computer. The remote computer can load the instructions into its dynamic memory and send the instructions over a telephone line using a modem. A modem local to computer system 2400 can receive the data on the telephone line and use an infra-red transmitter to convert the data to an infra-red signal. An infra-red detector can receive the data carried in the infra-red signal and appropriate circuitry can place the data on bus 2402. Bus 2402 carries the data to main memory 2406, from which processor 2404 retrieves and executes the instructions. The instructions received by main memory 2406 may optionally be stored on storage device 2410 either before or after execution by processor 2404.

The computer system 2400 also includes a network interface 2418 coupled to bus 2402. Network interface 2418 provides a two-way data communication coupling to one or more network links that are connected to one or more local networks. For example, network interface 2418 may be an integrated services digital network (ISDN) card, cable modem, satellite modem, or a modem to provide a data communication connection to a corresponding type of telephone line. As another example, network interface 2418 may be a local area network (LAN) card to provide a data communication connection to a compatible LAN (or WAN component to communicate with a WAN). Wireless links may also be implemented. In any such implementation, network interface 2418 sends and receives electrical, electromagnetic or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 2418, which carry the digital data to and from computer system 2400, are example forms of transmission media.

The computer system 2400 can send messages and receive data, including program code, through the network(s), network link and network interface 2418. In the Internet example, a server might transmit a requested code for an application program through the Internet, the ISP, the local network and the network interface 2418.

The received code may be executed by processor 2404 as it is received, and/or stored in storage device 2410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
obtaining a training dataset, the training dataset comprising sheet passage interval summary statistics information associated with conveyance of a plurality of sheets in a sheet conveyance path of a training sheet processing apparatus, at least a portion of the sheets of the plurality of sheets having a known sheet classification of a set of sheet classifications;
obtaining sheet timing data, the sheet timing data comprising sheet passage interval summary statistics information associated with conveyance of a predetermined number of sheets in a sheet conveyance path of a deployed sheet processing apparatus;

classifying, using a machine learning model, the training dataset and the sheet timing data, for an interval window of a plurality of different interval windows, the predetermined number of sheets in the sheet conveyance path of the deployed sheet processing apparatus as a particular classification of the set of sheet classifications;

adjusting, based on the classifying, one or more operational parameters of the deployed sheet processing apparatus;

receiving an actual sheet classification for a particular interval window of the plurality of different interval windows;

comparing the actual sheet classification with the particular classification associated with the particular interval window of the plurality of different interval windows;

determining, based on the comparison, an accuracy of the classifying;

iteratively modifying any of a type or number of inputs to the machine learning model until a threshold accuracy level is achieved;

obtaining additional training data associated with the deployed sheet processing apparatus;

generating second training data based on the additional training data; and classifying, using the machine learning model and at least the second training data, for each interval window of a second plurality of different second interval windows, a second predetermined number of sheets in the sheet conveyance path of the deployed sheet processing apparatus as a second classification of a second set of sheet classifications.

2. The system of claim 1, wherein the system comprises a portion of the deployed sheet processing apparatus.

3. The system of claim 1, wherein the system comprises at least a portion of a server system coupled over a communication network to the deployed sheet processing apparatus.

4. The system of claim 1, wherein the one or more operational parameters of the deployed sheet processing apparatus include any of image quality and toner usage.

5. The system of claim 1, wherein the instructions further cause the system to perform:
switching the classifying from using the training dataset to using the second training data.

6. The system of claim 5, wherein the switching is performed after obtaining a threshold amount of the sheet timing data.

7. The system of claim 5, wherein the second set of sheet classifications includes at least a portion of the set of sheet classifications and at least one additional sheet classification received by the deployed sheet processing apparatus.

8. A method, comprising:
obtaining a training dataset, the training dataset comprising sheet passage interval summary statistics information associated with conveyance of a plurality of sheets in a sheet conveyance path of a training sheet processing apparatus, at least a portion of the sheets of the plurality of sheets having a known sheet classification of a set of sheet classifications;

obtaining sheet timing data, the sheet timing data comprising sheet passage interval summary statistics information associated with conveyance of a predetermined number of sheets in a sheet conveyance path of a deployed sheet processing apparatus;

classifying, using a machine learning model, the training dataset and the sheet timing data, for an interval window of a plurality of different interval windows, the predetermined number of sheets in the sheet conveyance path of the deployed sheet processing apparatus as a particular classification of the set of sheet classifications;

adjusting, based on the classifying, one or more operational parameters of the deployed sheet processing apparatus;

receiving an actual sheet classification for a particular interval window of the plurality of different interval windows;

comparing the actual sheet classification with the particular classification associated with the particular interval window of the plurality of different interval windows;

determining, based on the comparison, an accuracy of the classifying;

iteratively modifying any of a type or number of inputs to the machine learning model until a threshold accuracy level is achieved;

obtaining additional training data associated with the deployed sheet processing apparatus;

generating second training data based on the additional training data; and classifying, using the machine learning model and at least the second training data, for each interval window of a second plurality of different second interval windows, a second predetermined number of sheets in the sheet conveyance path of the deployed sheet processing apparatus as a second classification of a second set of sheet classifications.

9. The method of claim 8, wherein the deployed sheet processing apparatus is coupled to at least a portion of a remote server system over a communication network.

10. The method of claim 8, wherein the one or more operational parameters of the deployed sheet processing apparatus include any of image quality and toner usage.

11. The method of claim 8, further comprising:
switching the classifying from using the training dataset to using the second training data, the second training data being based on the additional training data.

12. The method of claim 11, wherein the switching is performed after obtaining a threshold amount of the sheet timing data.

13. The method of claim 12, wherein the second set of sheet classifications includes at least a portion of the set of sheet classifications and at least one additional sheet classification received by the deployed sheet processing apparatus.

* * * * *